United States Patent [19]

Morrin, II

[11] 3,987,412
[45] Oct. 19, 1976

[54] METHOD AND APPARATUS FOR IMAGE DATA COMPRESSION UTILIZING BOUNDARY FOLLOWING OF THE EXTERIOR AND INTERIOR BORDERS OF OBJECTS

[75] Inventor: Thomas Harvey Morrin, II, San Jose, Calif.

[73] Assignee: International Business Machines Corporation, Armonk, N.Y.

[22] Filed: Jan. 27, 1975

[21] Appl. No.: 535,453

[52] U.S. Cl. ............. 340/146.3 AE; 340/146.3 MA
[51] Int. Cl.$^2$ ......................................... G06K 9/16
[58] Field of Search............ 340/146.3 R, 146.3 AE, 340/146.3 MA, 146.3 H

[56] References Cited
UNITED STATES PATENTS

| | | | |
|---|---|---|---|
| 3,303,465 | 2/1967 | Essinger et al. ............ | 340/146.3 AE |
| 3,593,283 | 7/1971 | Miyamoto et al. ............ | 340/146.3 Y |
| 3,605,093 | 9/1971 | Parks et al. .................... | 340/146.3 J |
| 3,609,685 | 9/1971 | Deutsch..................... | 340/146.3 AE |
| 3,863,218 | 1/1975 | Oka et al................... | 340/146.3 AE |

OTHER PUBLICATIONS

Sidhu et al., "Property Encoding:Application in Binary Picture Encoding and Boundary Following," *IEEE Transactions on Computers*, vol. C–21, No. 11, 11–1972, pp. 1206–1215.
Kruse, "A Parallel Picture Processing Machine," *IEEE Transactions on Computers*, vol. C–22, No. 12, Dec. 1973, pp. 1075–1087.

*Primary Examiner*—Leo H. Boudreau
*Attorney, Agent, or Firm*—Otto Schmid, Jr.; R. Bruce Brodie

[57] ABSTRACT

A binary image containing objects comprised of black picture elements (pels) in a bit-addressable random access memory, is scanned in a predetermined order, until a black pel is encountered. The object is then encircled by a boundary follower in a clockwise direction, and each pel is recorded as it is encountered in a chain link format. Each black pel is changed to white as it is encountered provided it is not an interior boundary point. After the object has been completely encircled by the follower, encoding of the points is temporarily terminated. The follower continues to encircle the object several times, deleting black pels as it goes, until all of the black points in the object are exhausted except for the interior boundary. At this point, the remaining interior boundary pels are traced out and encoded in the same chain link format.

Objects within objects are also encoded. A stack is provided to store the coordinates of the occurrence of each mode change described below. As the follower traces out the outer boundary and begins to strip out the object interior, the first time an inner boundary point is observed, the follower puts its location in the stack, steps over to the inner boundary and follows all the way around the inside in a counterclockwise direction encoding the pels encountered. An outer vs. inner test is done to assure that the supposed inner boundary is not really a thin point in the shrinking object. After the inner boundary is encoded, the follower begins to blacken its interior. If a black point is encountered, it is theorized to be the outer boundary of an object which is inside the inner boundary just encoded. This is verified by means of the outer vs. inner test. The follower puts its location in the stack and encodes the object found in the same manner as above. This generates encoded data which has a nested structure.

Decompression is accomplishd in two steps. The outer boundary is traced out and the entire interior is made black, and then each inner boundary is traced out and their interiors are made white.

6 Claims, 28 Drawing Figures

DATA FLOW CONTOUR COMPRESSION/DECOMPRESSION APPARATUS

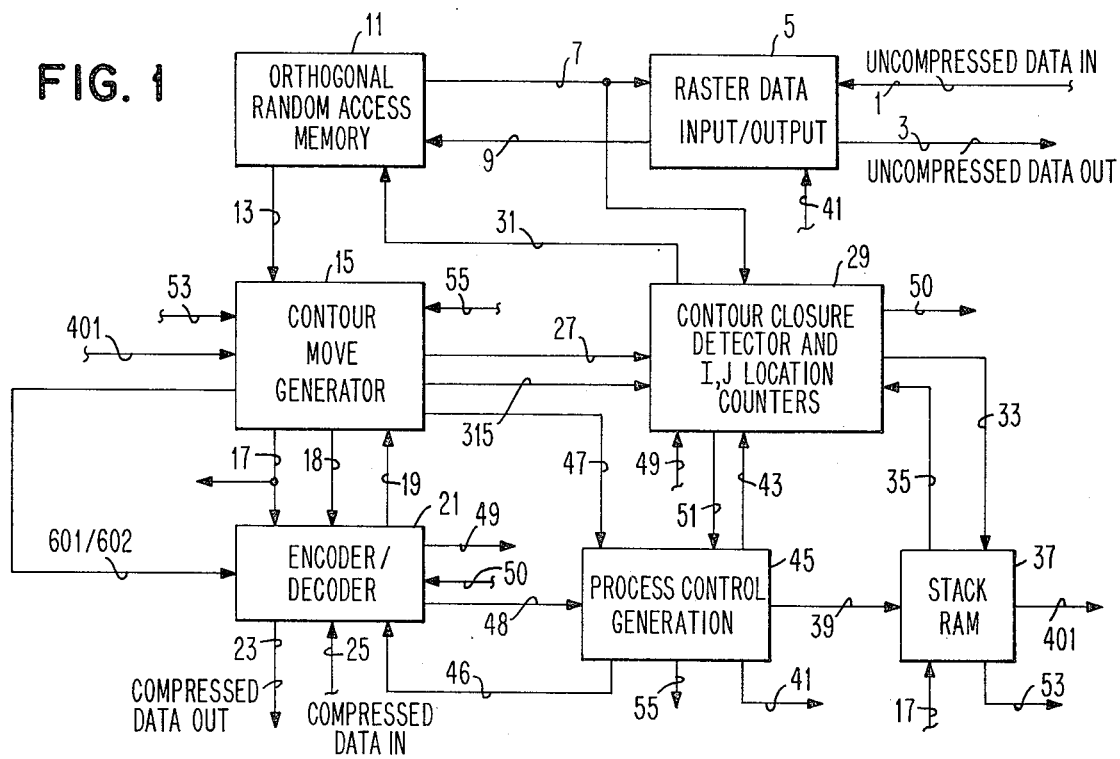
DATA FLOW CONTOUR COMPRESSION/DECOMPRESSION APPARATUS
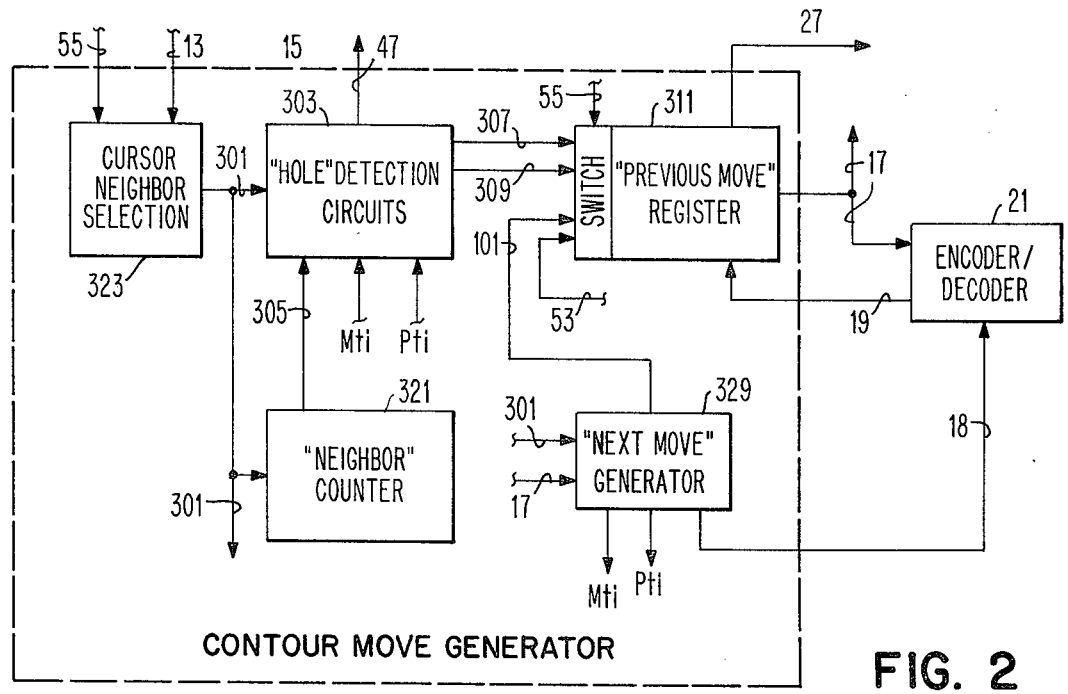

| FROM \ TO | RASTER SEARCH | RECORD BOUNDARY | FILL / SHRINK | TEST FOR HOLE |
|---|---|---|---|---|
| RASTER SEARCH | N/A | BLACK PEL FOUND STOP RASTER SEARCH COUNT & LOAD I,J COUNTERS | N/A | N/A |
| RECORD BOUNDARY | N/A | N/A | INITIAL POINT REENCOUNTERED. START DELETION (SHRINKING) OF OBJECT | N/A |
| FILL / SHRINK | 1. NO NEIGHBORING POINT TO MOVE CURSOR. THIS INDICATES THAT FILL IS COMPLETE FOR THAT LEVEL OF NESTING. 2. STACK IS EMPTY. | N/A | 1. NO NEIGHBORING POINT TO MOVE CURSOR. THIS INDICATES THAT FILL IS COMPLETE FOR THAT LEVEL OF NESTING. 2. STACK NOT EMPTY. 3. I,J COUNTERS LOADED WITH STACK DATA. | POINT FOUND TO RIGHT OF THE DIRECTION OF MOTION. BORDER BEING FOLLOWED MAY BE EITHER AN INNER OR OUTER BOUNDARY. CURRENT I,J LOCATION IS PLACED ON THE STACK. THE STARTING POINT FOR THE HOLE TEST IS ALSO STORED ON STACK TO PERMIT DETECTION OF CLOSURE |
| TEST FOR HOLE | N/A | AN INNER/OUTER BOUNDARY HAS BEEN FOUND. THE CLOCK/COUNTERCLOCK TESTS SHOW DIRECTION TO BE CLOCKWISE | CLOCK/COUNTERCLOCK TESTS SHOW DIRECTION TO BE COUNTER CLOCKWISE. RETURN ADDRESS IN THE STACK IS LOADED INTO THE I,J COUNTER | N/A |

COMPRESSION TRANSITION MODES   FIG. 11A

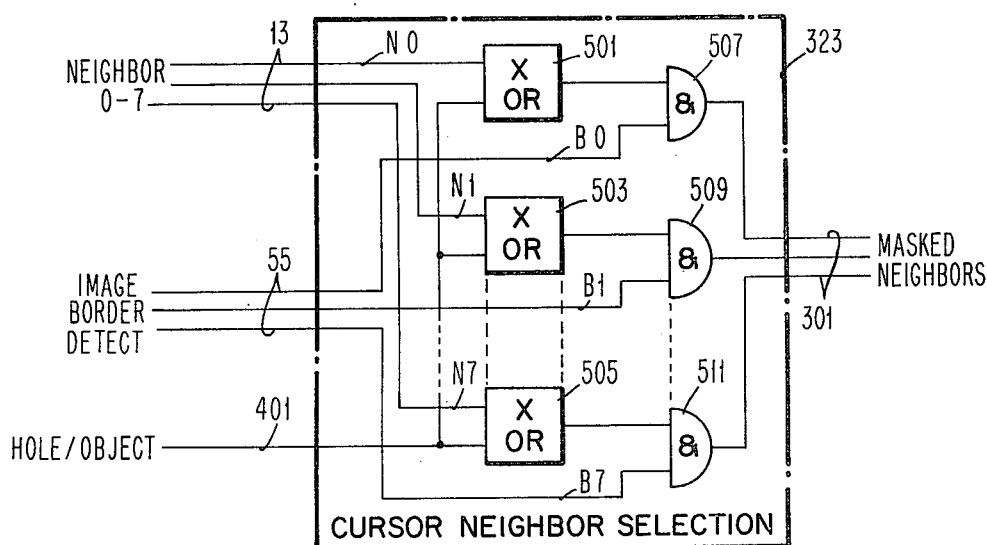

FIG. 5

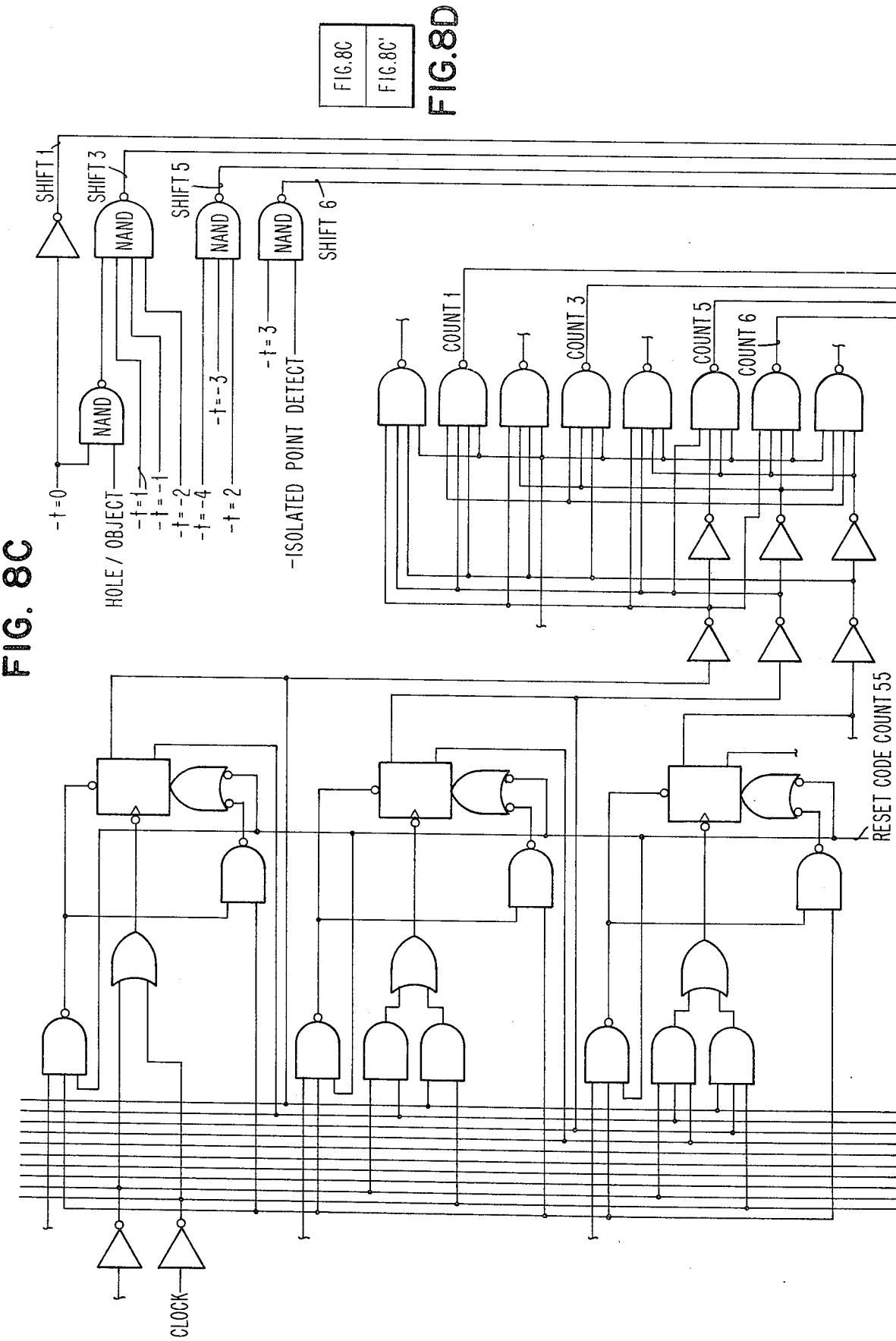

CODEWORD LENGTH GENERATOR AND CLOCKING FOR ENCODER/DECODER 21

SELECTION NETWORKS FOR I, J COUNTERS AND CONTOUR CLOSURE DETECTOR 29

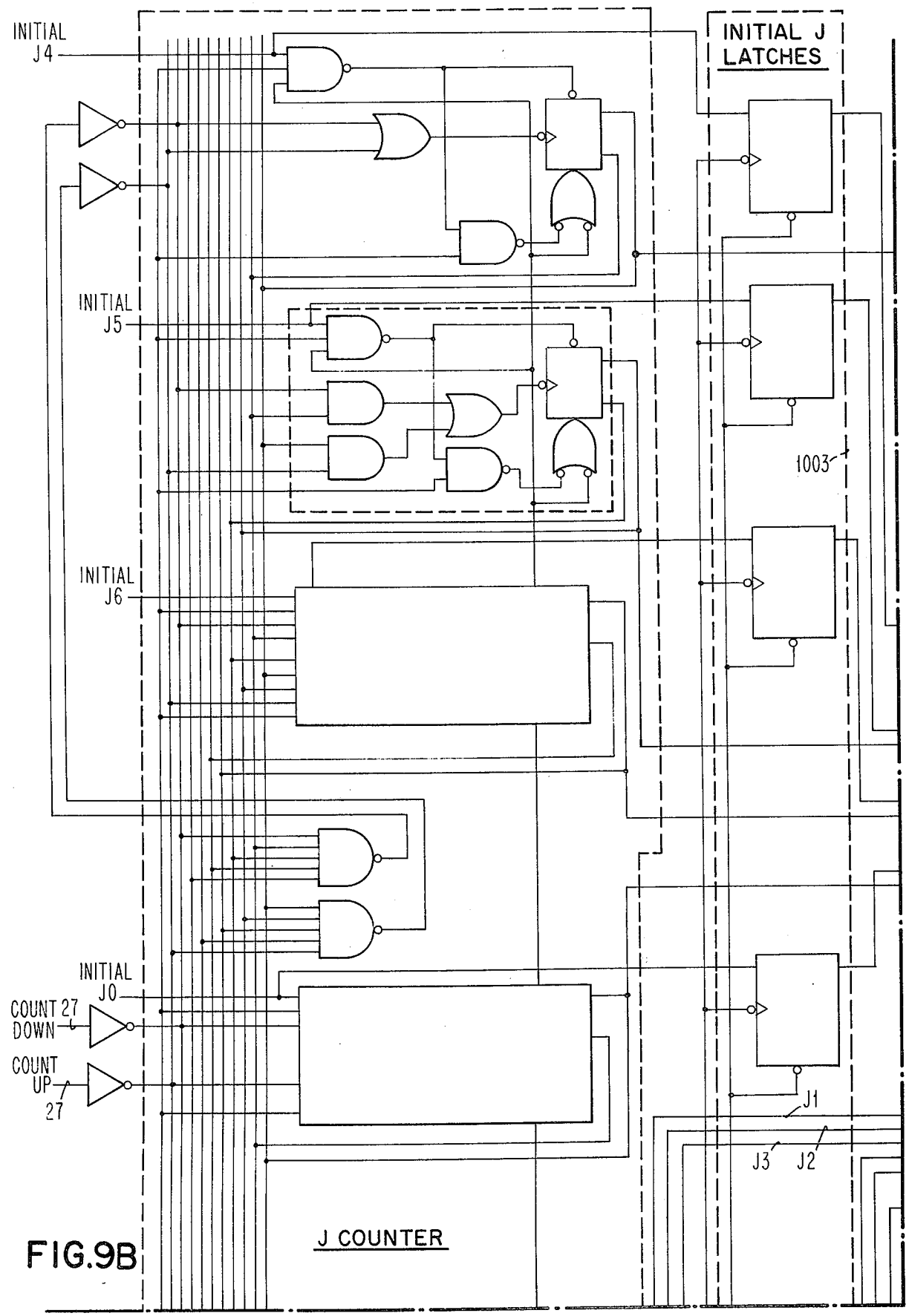

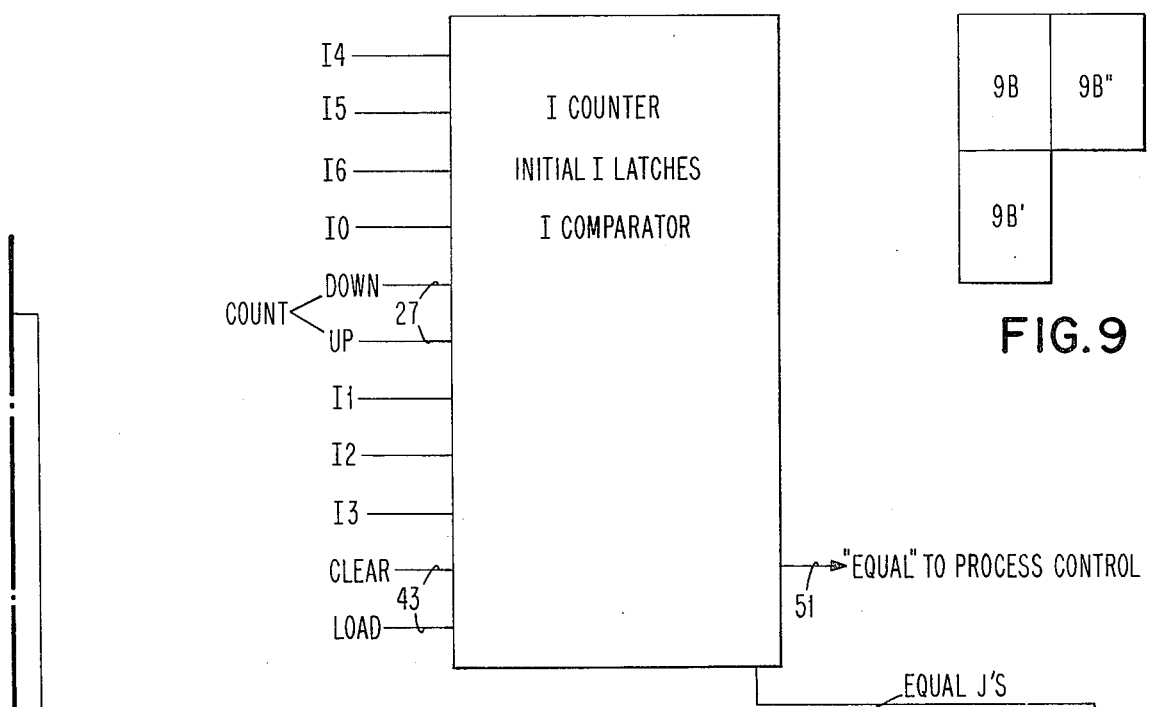
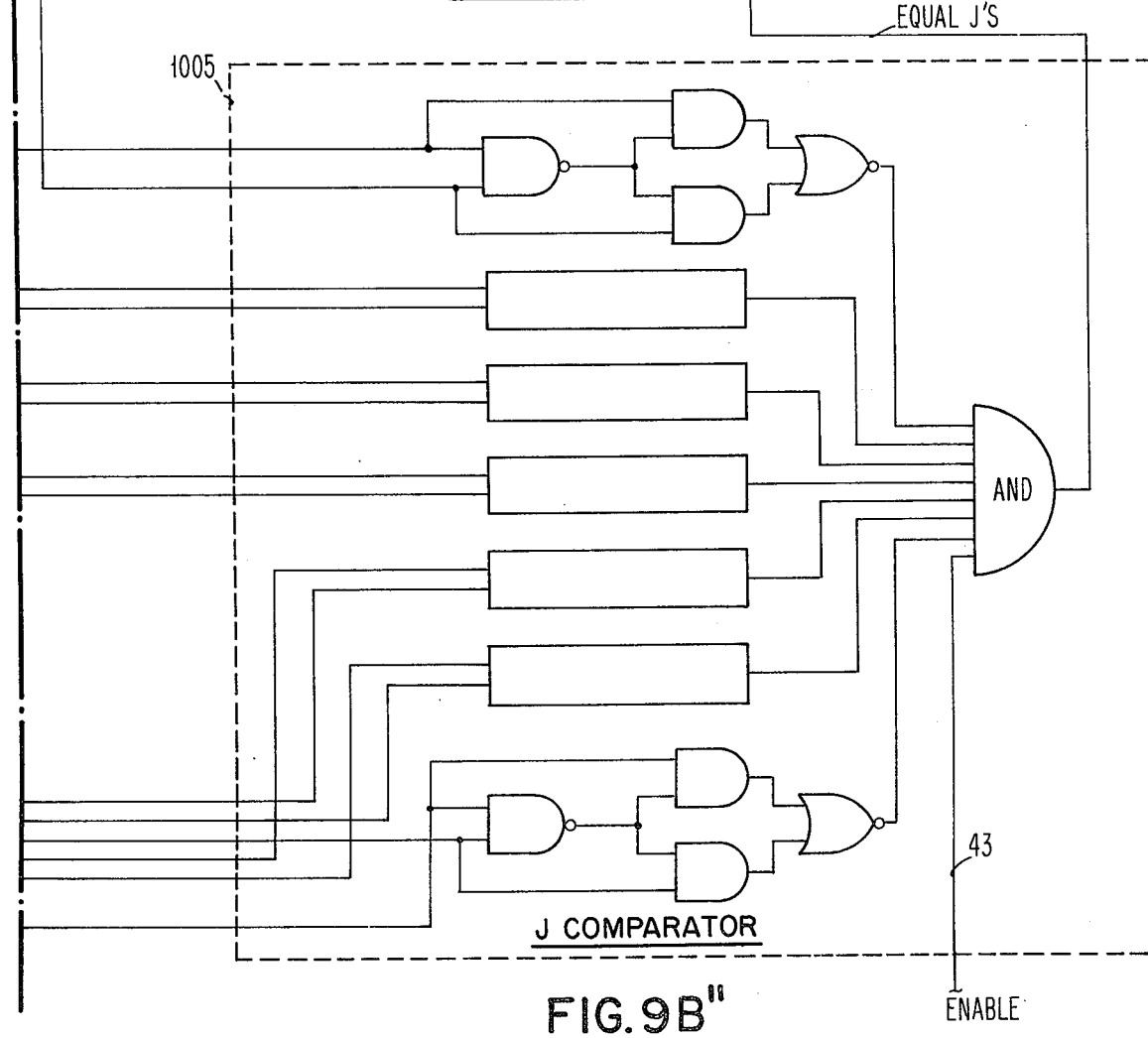
FIG.9
FIG.9B"

| FROM \ TO | RECORD BOUNDARY | FOLLOW | TEST FOR HOLE | FILL / SHRINK |
|---|---|---|---|---|
| RECORD BOUNDARY | ISOLATED POINT | INITIAL POINT REENCOUNTERED | N/A | N/A |
| FOLLOW | 1. INITIAL POINT REENCOUNTERED, THE DECOMPRESSION OF OBJECT (EXPANSION) IS COMPLETED.<br>2. NEW OBJECT BOUNDARY SHOULD NOW BE OBTAINED.<br>3. LOAD I,J COUNTERS & STACK FROM COMPRESSED DATA | N/A | POSSIBLE INTERIOR POINT SEEN ON THE RIGHT. STORE CURRENT LOCATION ON STACK. SEE FILL→TEST FOR HOLE (COMPRESS) | N/A |
| TEST FOR HOLE | N/A | INITIAL POINT REENCOUNTERED. TESTS SHOW COUNTER/CLOCKWISE. RETURN ADDRESS IN THE STACK IS LOADED INTO THE I,J COUNTERS | N/A | INITIAL POINT REENCOUNTERED. TESTS SHOW CLOCKWISE DIRECTION. A HOLE HAS BEEN DETECTED. |
| FILL / SHRINK | N/A | 1. NO NEIGHBORING POINT TO MOVE CURSOR THIS INDICATES THAT FILL IS COMPLETE<br><br>2. I,J COUNTERS LOADED WITH STACKED DATA | N/A | N/A |

DECOMPRESSION TRANSITION MODES

FIG. 11B

DIAGRAMMATIC STEPS IN THE CONTOUR CODING OF A BOUNDED OBJECT WITH HOLES

METHOD AND APPARATUS FOR IMAGE DATA COMPRESSION UTILIZING BOUNDARY FOLLOWING OF THE EXTERIOR AND INTERIOR BORDERS OF OBJECTS

BACKGROUND OF THE INVENTION

This invention relates to image data compression based on border following and by the encoding of the inner and outer boundaries of objects.

It is well appreciated in the art that a huge two dimensional array of Boolean coded points representative of a black/white image for even a single 8½ × 11 inches page is so large as to require compression in most applications. Techniques for achieving this redundancy reduction typically utilize a two-stage process. First, the image is passed through a predictor or prewhitener which, for example, may predict the black/white state of each picture element on the basis of information about the previous pel (picture element) and scan line. The predictor transmits 0' or 1' to the encoder depending upon whether the predicted value is correct or in error. In the second step, the resulting "error image" is compressed by run length encoding. Illustrative of such prediction/run length encoding may be found for example, in R. B. Arps, "Systems for Compression of Digital Data," U.S. Pat. No. 3,813,485 issued on My 28, 1974.

In general, predictive/run length encoding has two disadvantages. First, it is one dimensional in that each scan line is operated on seperately with the possible exception of the previous scan line information. Secondly, image manipulation operations cannot be conveniently performed on the compressed image data. This arises, in part, from the fact that the process of predicting and run length encoding obscures some relational data among the points in the compressed image that were to be found in the original image. Also, encoding is done by scan line, as opposed to encoding by object. This relational data can be recovered upon expansion of the compressed data. However, its absence when the data is in a compressed form means that any operation performed upon the compressed data is very tedious and, in fact, is equivalent to expanding the image first. The encoding of object boundaries as another method for achieving image compression suffers neither the disadvantage of one dimensionality nor the loss of relational data.

In the specification, an image is considered to be a two-dimensional array of points, each of which exhibits a Boolean value representative of a black or white picture element. A cluster of black elements is defined as a connected object if it possesses a single outer boundary closing upon itself.

The notion of boundary encoding, as suggested above, of the outer contours of a black object on a white background is not new. Methods for achieving this result may be found in Rosenfield, "Picture Processing by Computer", Academic Press, New York, Library of Congress No. 78-84255, at pp. 134–138. Also, one may find methods/algorithms in the literature which locate and organize lists of objects boundary contours. However, most of the methods/algorithms appear to operate on grey scale information. The few black/white algorithms appearing in the literature are at least partially raster based, thus requiring many passes over the entire array. Also, they require frequent reference to temporary lists or tags which constitute intermediate image planes for image processing purposes. Typically, the prior art methods/algorithms require several bits of storage for each picture element being processed. This requirement exists in order to identify those elements which are already in a chain and to distinguish boundary elements from interior elements.

SUMMARY OF THE INVENTION

It is accordingly an objective of this invention to devise a method/apparatus for image data compression based on boundary encoding of the outer and inner contours of objects. It is a related objective that such a compressed image be susceptible to image manipulation in that data relating to inner and outer contours be preserved.

The foregoing objectives are satisfied by a method and apparatus for boundary encoding objects within a two-dimensional array of points, each of which exhibits a Boolean value representative of black or white pels. For purposes of this invention a "connected objects" is said to exist when a cluster of black pels can be characterized by a single outer border closing upon itself and wherein there may exist inner contours, each inner contour defining a border of a cluster of white pels, said cluster of white pels being termed a "hole."

The method of the invention contemplates raster scanning an image array until a first black pel is ascertained. An initial array coordinate is thereupon recorded. At this juncture, the outer border of the object is encoded by a border follower. The border follower drives a "cursor," which encircles the object in a clockwise direction. The border follower records each black pel as it is encountered as a series of discrete differential azimuths in chain link coded form. The recording continues until the object is encircled.

After searching for and locating the object and encoding its outer boundary, it is then necessary according to the method to locate the inner boundaries of the object and eliminate the object from the image array. This is to avoid re-encountering the same object by the raster scan process. These steps are achieved by processing the object in outer contour layers of one pel thickness and complementing the Boolean value of each black pel as it is encountered such that the object is shrunk. The object is encircled as many times as it is necessary in order to reduce it to a single point.

The method further contemplates that as each pel is encountered along any contour layer, said pel is complemented if it would not fracture the object. By "fracture" it is meant the breaking of the objects into two objects as shown in tables 2 and 3. The method is interruptable when a point on an inner contour is first detected as a white neighboring pel to the right of the direction (clockwise) of the locus of the boundary followed points, the method continuing for purposes of differentiating between an inner boundary and a thin part of a shrunken object.

If it is determined that an inner boundary, i.e., a "hole," was encountered, then it is recorded in the same manner as was its parent object. Furthermore, the pel values within the inner boundary are, in turn, complemented one contour layer at a time. This occurs in the same manner as if it were a black object, the process being recursive, that is, there may be, another object within the hole which in turn has a hole, etc., until the original object is reduced to a single point.

This method is subject to several constraints. First, there can be no diagonal border following for holes, only rectilinear, x, y, moves are permitted. Second, a border cannot cross an image boundary. Thus, when the border follower is on an image boundary, it is necessary to constrain the cursor not to cross it by masking neighboring pels which are on the other side of the boundary.

Significantly, this invention preserves the nesting relationship of inner and outer boundaries in a compressed code string. It also permits finding and tracking of inner contours in the same sequential manner as that of outer contours, thus, the image can be manipulated in compressed as distinguished from uncompressed form, the relationship of inner to outer boundaries being preserved and objects, as opposed to scan lines, being treated as entities.

The decompression process is responsive to the compressed coded string as described in the previous paragraphs for reconstructing the original image. There are four basic steps involved. These are the decoding of the boundary, following of the boundary, testing for holes, and shrinking the holes. In essence, each object (hole) boundary is written into the initially blank image memory and the interior (inside the boundary) is filled in.

BRIEF DESCRIPTION OF THE DRAWINGS

Because the invention relates to image processing, logical, data and control flow, and diagrammatic figures are believed desirable to illustrate the invention. Thus, the preferred logical embodiment of the machine is disclosed in FIGS. 1–9. FIGS. 12 and 13, respectively, show control flow diagrams for the logical embodiments. FIG. 13 illustrates the encoding of an object diagrammatically. Lastly.

FIG. 1 shows the system logic and data flow among the principal elements of the contour compression/-decompression apparatus.

FIG. 2 shows the data flow for the "contour move generator" (border following element) shown in FIG. 1.

FIG. 5 illustrates the logic for the "cursor neighbor selection" of FIG. 2 and generates signals indicative of "masked neighbors" in response to the designation of a neighbor as being a hole or "object."

FIG. 8C' shows the codeword length generator and clocking for Encoder/Decoder 21.

FIG. 8D illustrates how FIGS. 8C–8C' may be placed to form a composite diagram of the Encoder/Decoder.

FIG. 9 illustrates how FIGS. 9B, 9B', and 9B'' may be placed to form a composite diagram of the I,J counters and the contour closure detector.

FIGS. 10, 11A–B show in both graphic and tabular form the principal systems states and transitions for both the compression and decompression modes.

FIG. 13 illustrates the effects upon an image object of the major compression steps.

FIG. 14 shows the detailed logic for the raster search mechanism.

DESCRIPTION OF THE PREFERRED EMBODIMENT

Figure 3:
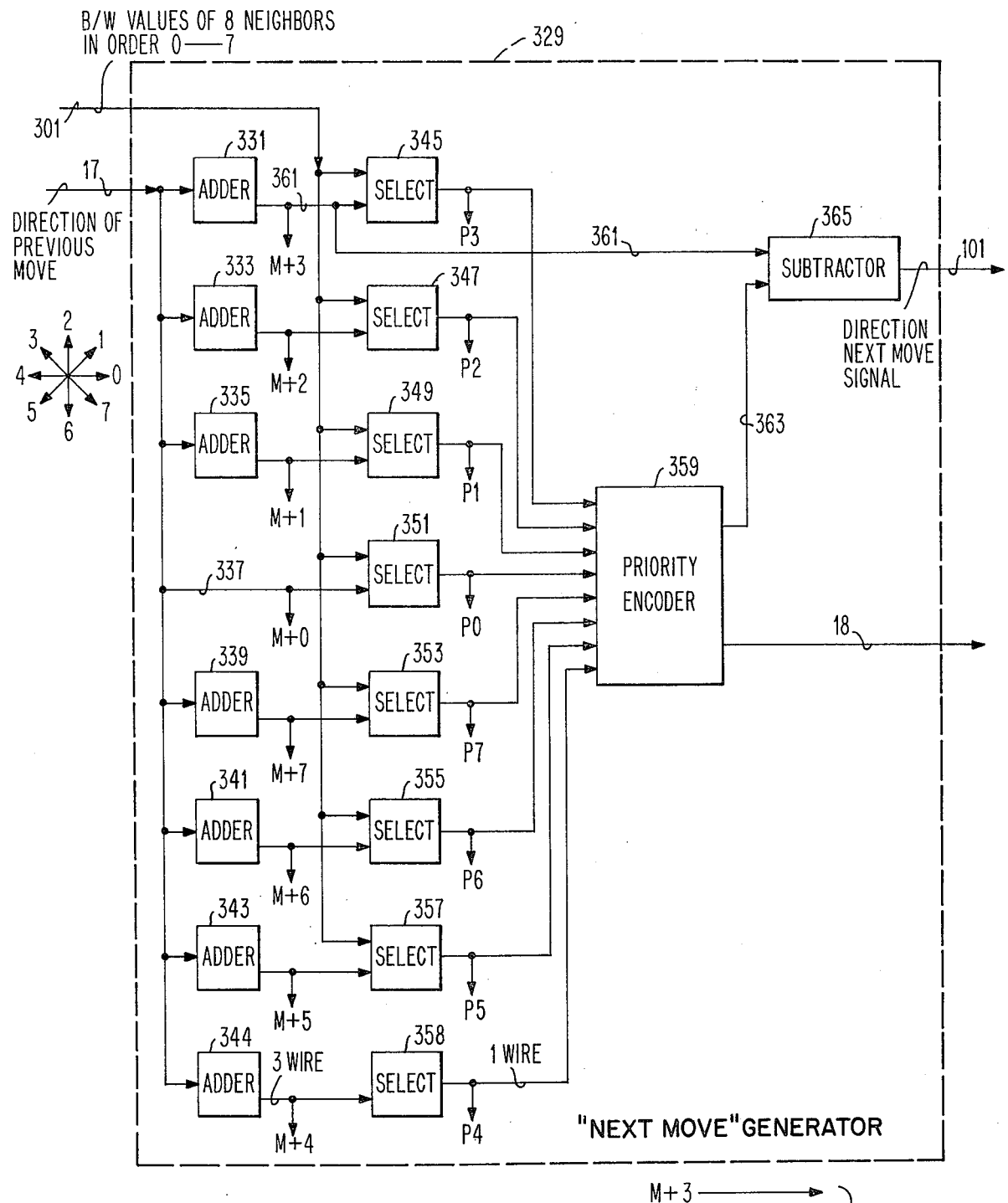
FIG. 3 sets forth the "next move" generator of FIG. 2 and is responsible for determining the direction of the next move for the cursor in response to the direction of the previous move and to the black/white value of the eight pel neighbors where the cursor is presently situated.

An image has been defined as a two-dimensional array of Boolean coded points, each point of which being representative of black/white pels. Clusters of black pels are perceived as objects, an object being characterized by a single outer contour closing upon itself and selectively containing inner contours circumscribing clusters of white pels being perceived as holes. For purposes of this embodiment, an object may be further defined as an eight-connected set of black pels while a hole is a four-connected set of white pels none of which coincide with the border of the image. Now, both objects and holes are surrounded by "edges." Edges are pairs of four adjacent elements of opposite brightness. Lastly, the "border" of an object consists of black edge elements while the border of a hole consists of its white edge elements plus the white elements of the eight adjacent pairs of black/white points. Thus, a black object boundary is an eight-connected set and a white hole boundary is a four-connected set.

A "border follower" is considered to be a mechanism by which a "cursor" moves from an object border point to the neighboring border point in a clockwise direction. The coordinate system is I-units left to right and J-units top to bottom. The follower, therefore, turns as sharply left as possible from the direction of the previous move subject to the constraint that it must move to a neighbor possessing the same brightness value. If a cursor were following the border of a black object, then it would assume the direction of the leftmost black pel. An "about-face" turn is allowed as a last resort.

This preferred embodiment of this invention is constrained to a storage requirement of no more than one bit per picture element. It is further constrained in that the method is totally sequential and without any ability to remember past encoding except for a small number of I, J coordinates temporarily written into a limited "stack" memory. In the embodiment, the stack is a limited memory for storing points at which a mode change recently took place. Lastly, the embodiment is constrained to be formed from very simple functional building blocks. In its most primitive form it consists of an orthogonal random access memory for storing the image, a contour follower, and a stack.

It is well known from H. Freeman, "A Review of Relevant Problems in the Processing of Line Drawing Data" appearing in Automatic Interpretation Classification of Images, A. Grasselli, Editor, Academic Press, New York, 1969, L. C. 76-84225 at pp. 155–174, that chain link coding of image parts makes certain manipulative operations convenient as for example, rotation, magnification, smoothing, mathing and editing. In this invention, the image data becomes transformed into a list of object/hole boundaries amenable to the above manipulation. Additionally, there is a very important attribute of the nesting of the object and hole chains wherein the hole boundaries are identified as belonging to parent object boundaries and objects which are within holes are also so identified.

The method of the invention will encode objects and hole boundaries of an arbitrary black/white image in chain link form. The method comprises four steps. These are (1) search for the object, (2) record its boundary, (3) shrink the object, and (4) test for hole.

Searching for objects in a two-dimensional array of image points is done in row major order (left to right, top to bottom). An object has been found when a black picture element is encountered. The boundary of each found object is then encoded in chain link form as the border of the object is followed. The possibility of the found object being a "double object," described later, requires that the follower make a cursory trip around the object prior to encoding. The encoded data consists of the $i,j$ locations of the start point and a sequence of discrete moves from boundary point to neighboring boundary point. The encoding process is terminated for that boundary, when the initial point is reencountered by the border follower. The possibility of an isolated point requires the existence of a special code because the decoder would not otherwise be able to detect a return to the original point.

After the object boundary is encoded, the object is shrunk by a continuation of the border following mechanism wherein each "deletable element" encountered is complemented. In this regard, the border following mechanism may make several trips around the border of the shrinking object. Ocassionally, during the shrinking process, the presence of a possible hole is detected. This is manifest as the appearance of a neighboring white pel to the right of the direction of motion of the clockwise border following. On the other hand, this also prospectively, could be the thin part of the shrinking object. In order to determine which of these possibilities is, in fact, the case, a "test for hole" operation is invoked. This test involves border following the possible hole by moving from one "four-connecte" white border pel to the next until the follower returns to where it started. The moves are weighted as to whether they involve a left turn or a right turn. Left turns are assigned a positive weighting while right turns are assigned a negative weighting. This permits a determination as to whether or not a hole exists at this point. The details of this testing will be further described in a subsequent paragraph.

If a hole has indeed been detected, a recordation of the boundary mechanism is invoked, i.e., boundary of the hole is chain link encoded. The hole is then shrunk, i.e., dimensionally reduced. The shrinking of the original object is then continued. If, during the shrinking of the hole, a separate object is encountered, as for example, an object inside the hole, then a "test for object" is invoked. This test is equivalent to the "test for hole" except the test for object operates as an eight-connected black border.

A stack memory having a stack discipline of last in/first out (LIFO) is required to maintain a list of return addresses at various nodes of the process tree. The maximum stack depth for an $n \times n$ image is $n/2$. This occurs for concentric squares of one pel thickness each. In practice, the stack depth required is far less than this. First, if the image is scanned quantization noise causes many of the lines in such an image to either be broken or to run together. Second, as a matter of economy an image of 1 million points is compressed into uniformly sized subarrays or "windows." A typical "window size" is of the order of 128 × 128 pels.

After the original object has been dimensionally reduced to zero (implying that the stack is empty) the next object is searched for, again in row major order starting from the point where the first black pel was found. The image array is considered to be completely encoded when this raster search process has examined all image points.

Figure 13:
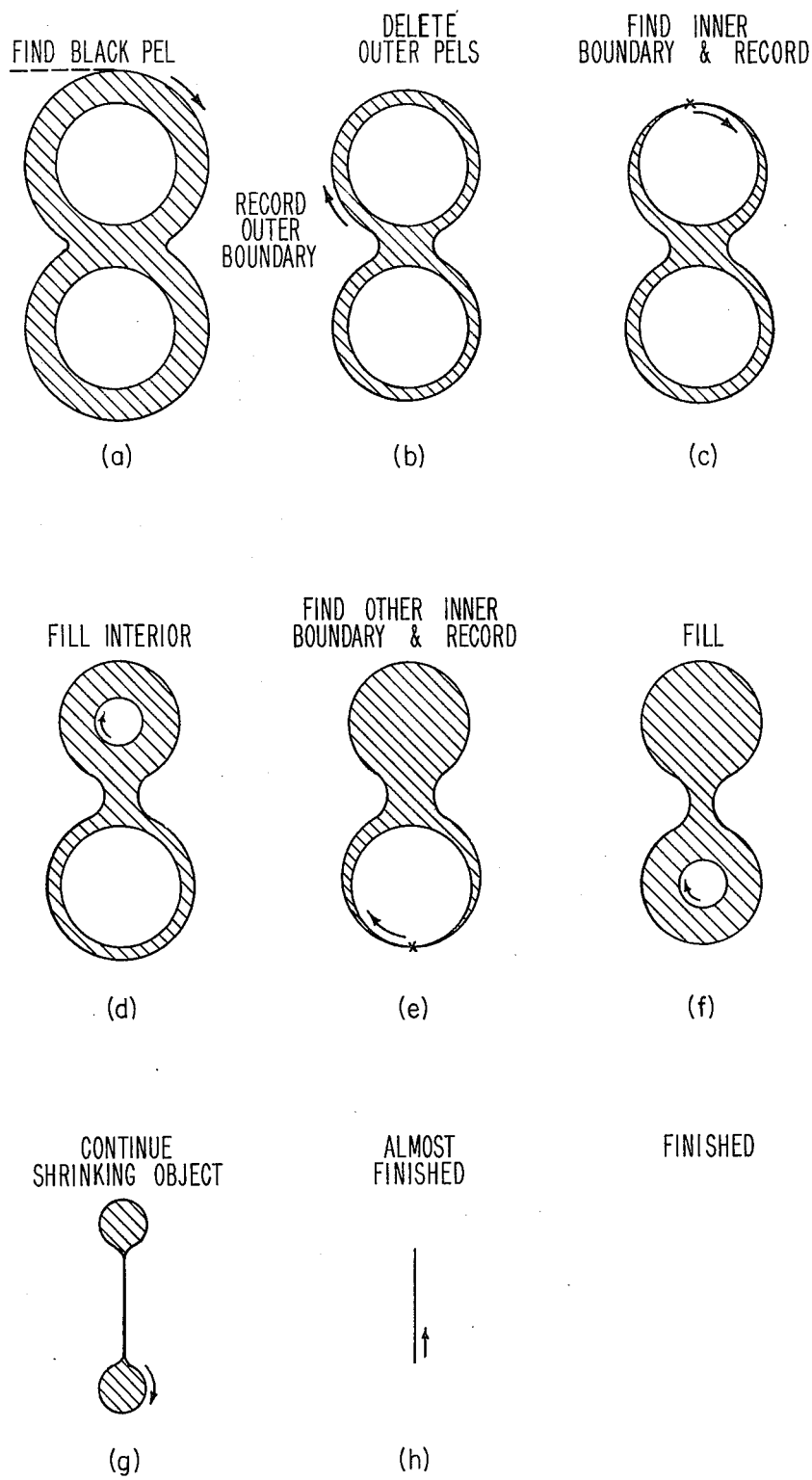

Referring now to FIG. 13, there is shown the diagrammatic steps for compression coding a bounded object with holes according to the invention. In FIG. 13A, an array of 1's and 0's is laid out showing a representative object with interior holes. The raster scan process from left to right, top to bottom, would encounter only rows of 0's until it hit the top of the figure. When the first black pel (represented by binary "1") is found an initial array coordinate is recorded and then the border follower moves along the boundary of the object recording a series of discrete differential azimuths for each successive black border pel as it is encountered until it winds up at its starting location. This constitutes the second step of the method, i.e., the recordation of the outer boundary. FIGS. 13B and C illustrate the step of shrinking or dimensionally reducing the object by repeatedly encircling the object and stripping off deletable pels in the outer contour layer on each encirclement. This continues until the object is dimensionally reduced to zero or until a first white pel is encountered to the right of the cursor's direction of travel. The test for hole is made by first following a prospective border and accumulating the corresponding series of differential azimuths. If the sequence closes upon itself in a clockwise direction, the inner contour and the interior points are processed in the same manner as if they were a black object. This is shown in FIGS. 13D, E and F.

Figure 10:
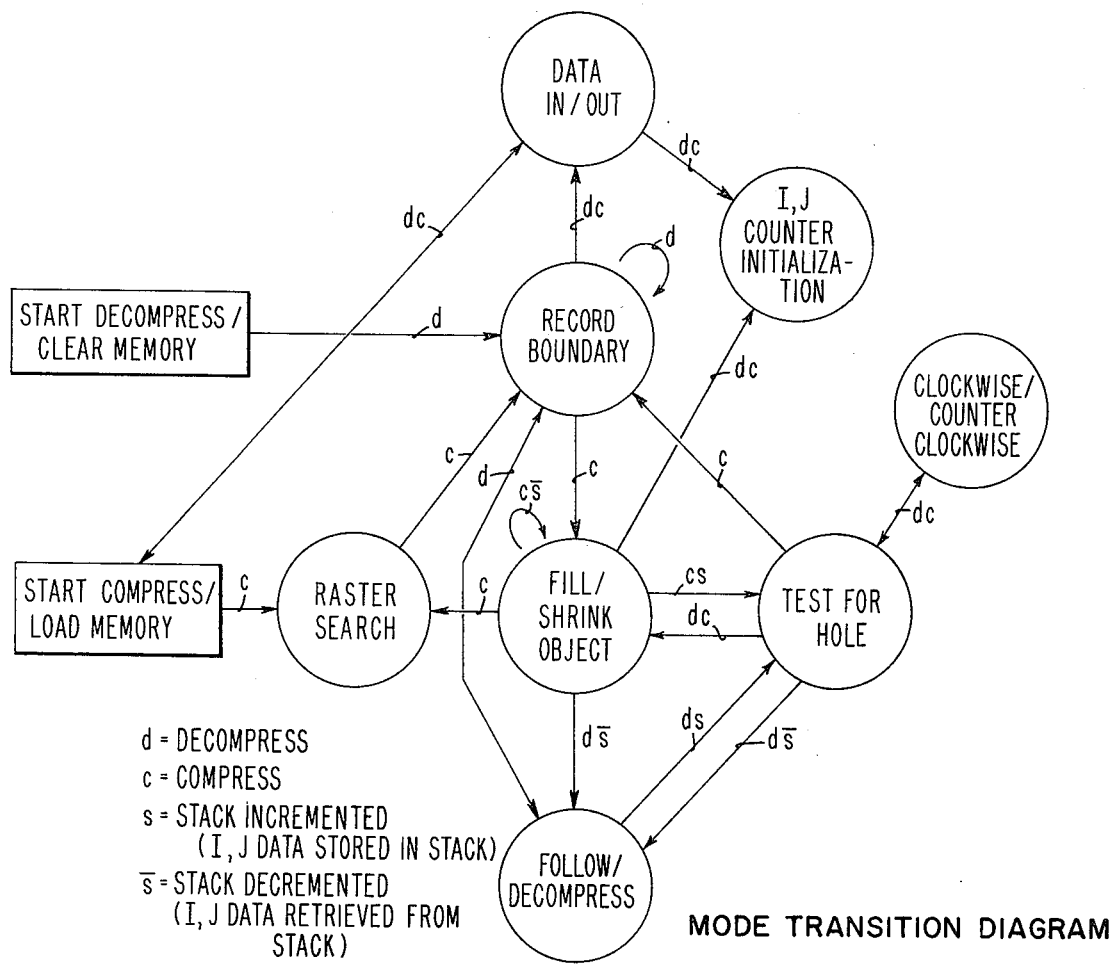
FIG. 10 defines the data flow relationships in terms of mode transitions, while FIG. 11 defines the transition from mode to mode descriptively.

Referring now FIGS. 10 and 11B and considering the decompression or decoding of the compressed chain link data, it is pertinent to note that reconstituting the image uses the same functional building blocks as that of compression. These building blocks are, namely, the orthogonal image memory, the border follower, and the stack. The decompression method comprises the steps of boundary decoding, border following, test for hole, and shrinking hole. As can be seen in FIG. 10 the decode boundary step takes in the coded data and blackens the image points along the contours specified by the chain link data. Termination of this step is done implicitly by noting a match with the original point. There is one exception in the case of the isolated point. The isolated point case uses a special code for termination as shown in table 1. The step also can be used to create holes in the objects, in which case, it makes each point white.

The border following step will follow along the boundary which was generated by the decode boundary step and look for possible holes. In this context, holes are again detected as points of opposite brightness to the right of direction of movement. Also, in this context of decompression the use of the word hole, although correct, may be ambiguous. It refers simply to the groups of white pels which are inside the outer border of the object.

The border following step is terminated when the coordinates of the original boundary points are reencountered. If a possible hole is found, a test for hole operation is invoked. If the test indicates the presence of a hole, it is filled via a shrink hole operation.

The set of pels comprising the border of an object is eight-connected. There may be several four-connected holes within the border set. Each of these must be filled in order to reconstruct the original object. The mechanism for doing this is based upon the observation that there exist some pel in each hole which must be four-connected to a border pel. The same argument applies to a four-connected white border surrounding black inner points. These groups of black inner points must be considered to be eight-connected.

The steps of the compression method and its logical dual, the decompression method, are reflected in the mode transition diagram in FIG. 10. In broad terms, an apparatus for implementing the method of the invention may be said to include a memory for storing the image array, a contour or border following element, and a stack memory for holding the $i,j$ coordinates to be returned to as the corresponding nesting levels are completed. Contour coding would start by loading the image in the memory and then raster searching the image array in row major order. When a black pel was found its Cartesian coordinates (I,J) would be stored. The border follower then records the outer boundary as a series of discrete differential azimuths. The object is then dimensionally reduced until a white pel in the direction of cursor travel is detected. At this point a test for hole is made and the stack is incremented. That is, the (I,J) location of the pel at which the neighboring white pel was encountered is stored in the stack. If the hole test is affirmative then the hole is recorded and filled by peeling off deletable elements in the hole by logically complementing each pel in the same manner as an object is dimensionally reduced. This continues until the hole is completely filled or there is a black pel to the right of direction of cursor travel indicative of a possible object within the hole.

Figure 12A:
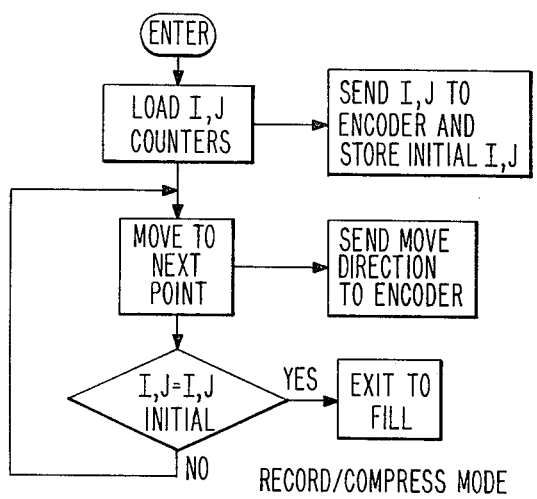
FIGS. 12A–E represents a flow diagram for each of the major modes.
Figure 12B:
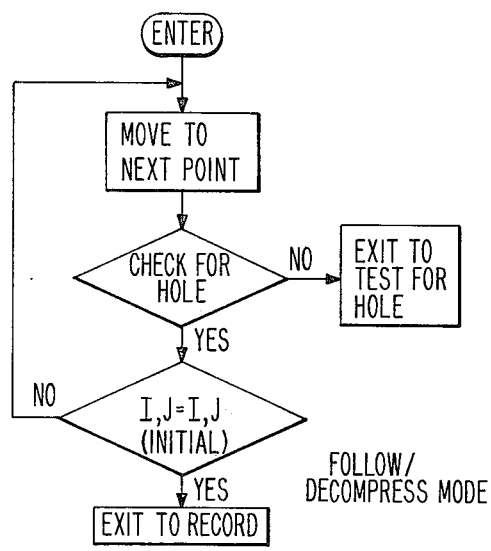
Figure 12C:
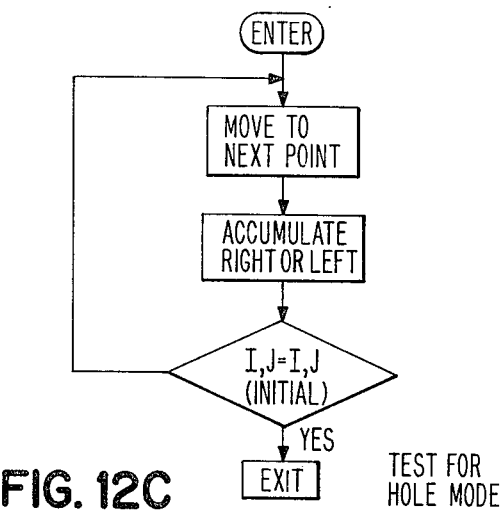
Figure 12D:
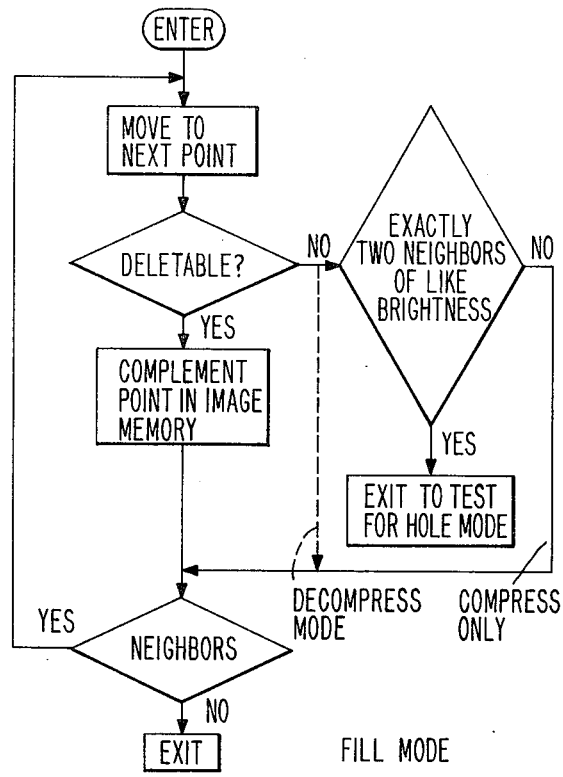

Referring now to FIGS. 10 together with 11A, if the system were performing compression coding and was in the raster search mode, it would transfer to the record boundary mode, so to speak, and indicate that a black pel has been found, the contents of the appropriate location counters being set with the black pel coordinates. Now, if one turns to FIG. 12A there is shown a flow diagram for recording in the compress mode. Thus, if FIGS. 11A and B are taken together with counter part control flow diagrams 12A–E then the appropriate data transfers and tests for each of the compression/decompression method steps are defined.

Referring now to FIG. 1, there is shown a system logic and data flow. Uncompressed data enters and exits through port 5, respectively, over wire pairs 1 and 3. Likewise, compressed data enters and exits the system through port 21 over paths 25 and 23. The image array may be formed from a series of raster coded points applied over path 1 through input port 5 and stored in random access memory 11. If the random access memory were of the orthogonal type such as described in copending U.S. patent application Ser. No. 498,352 filed on Aug. 19, 1974, then the array could be read out in row major order when the system was in the raster search mode.

Figure 8A:
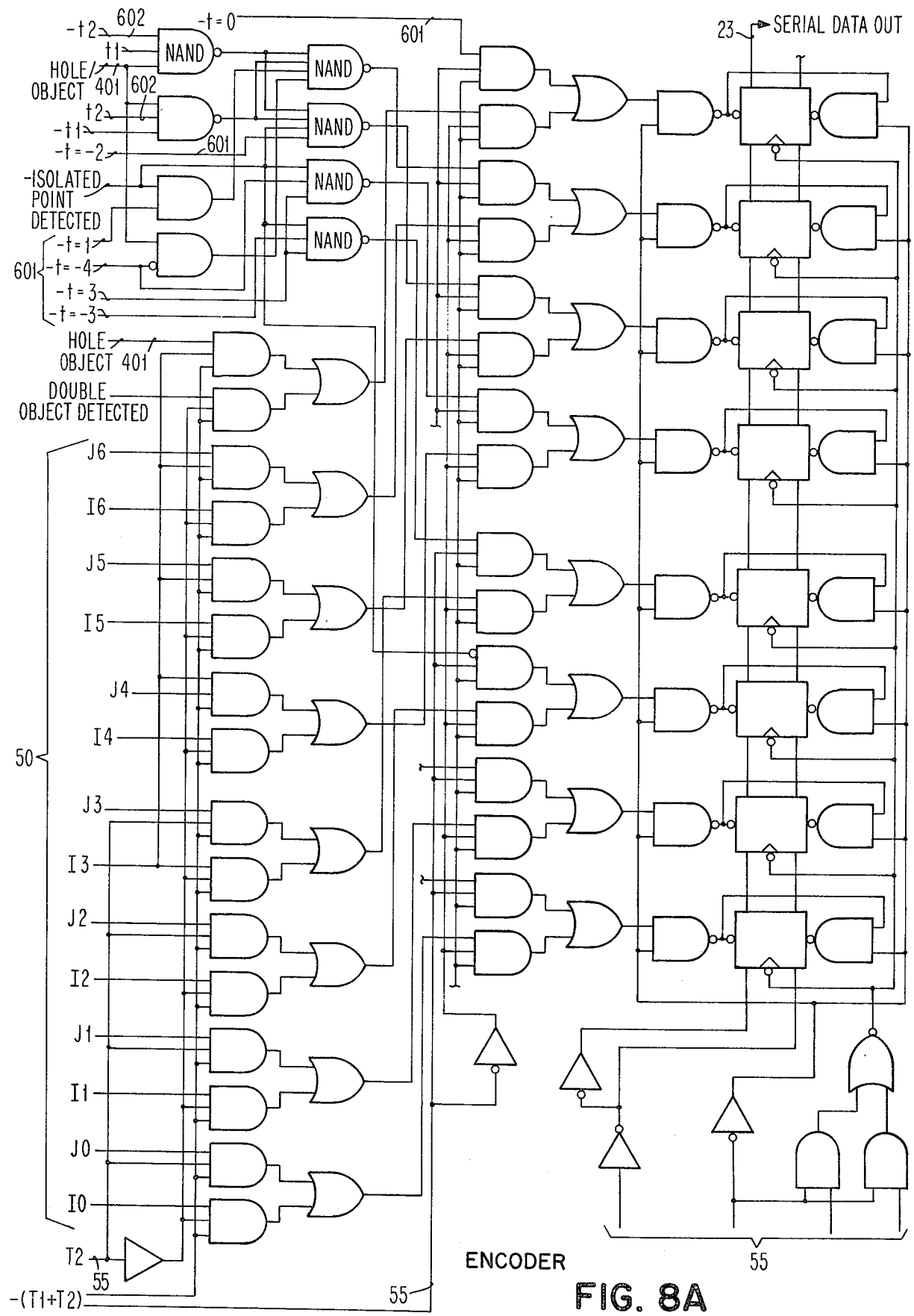
FIG. 8A shows a typical encoder for generating code words for a series of discrete differential azimuths conforming to a series of moves by cursor about an inner or outer boundary of an object or hole.
Figure 8B:
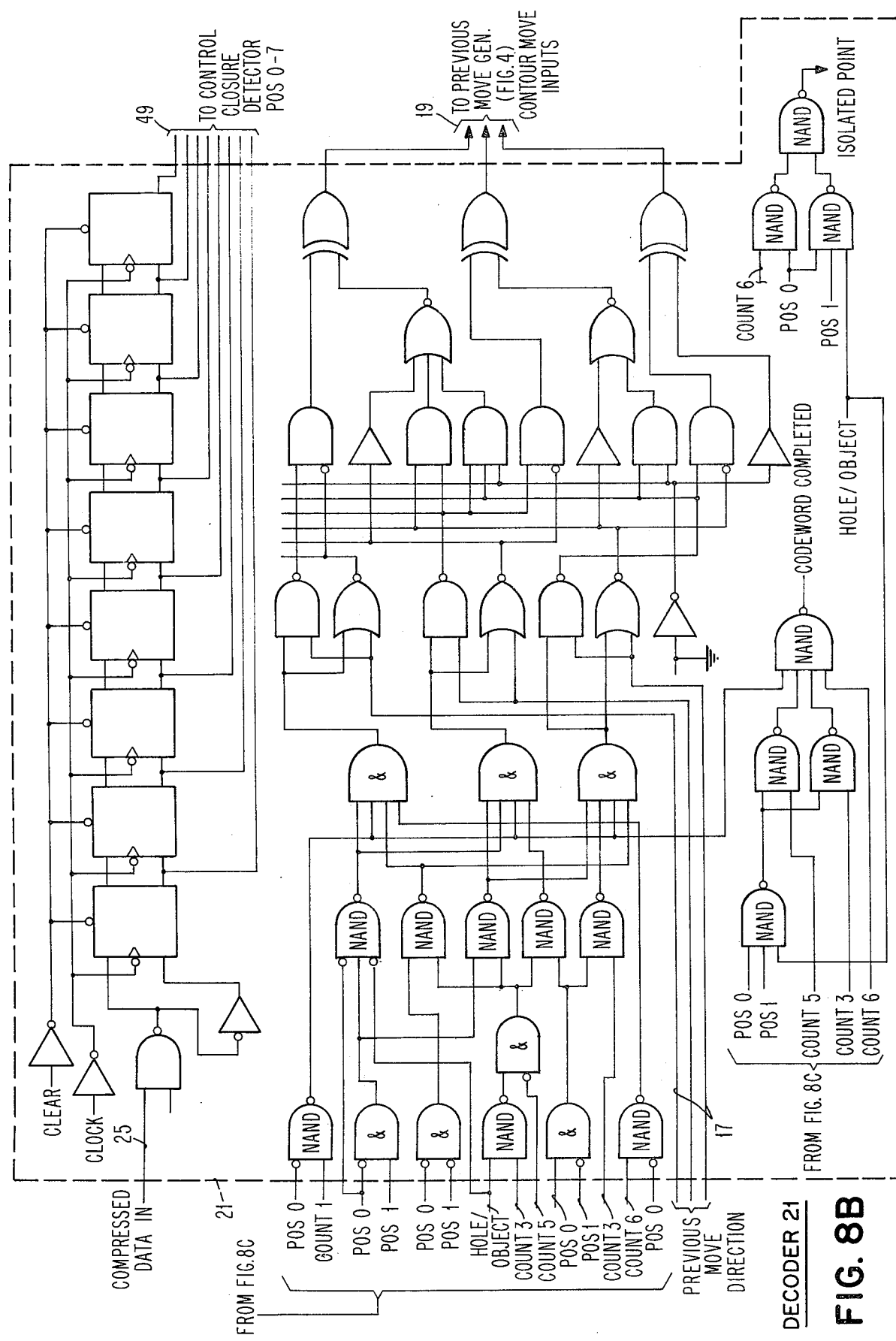
FIGS. 8C and 8B represent the counterpart (decompression step) wherein the chain link coded data is converted into contour moves.
Figure 8C:
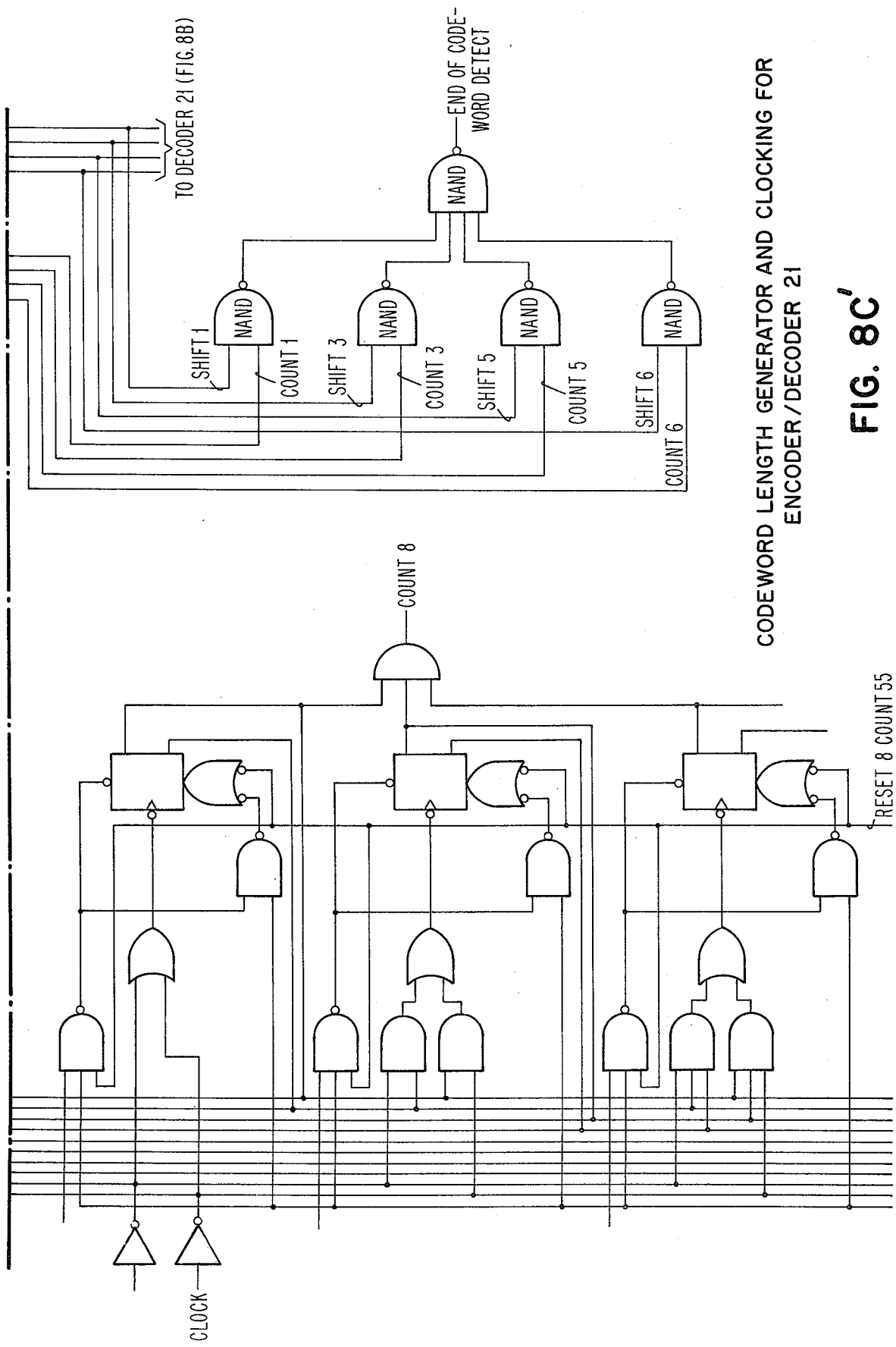
Figure 9A:
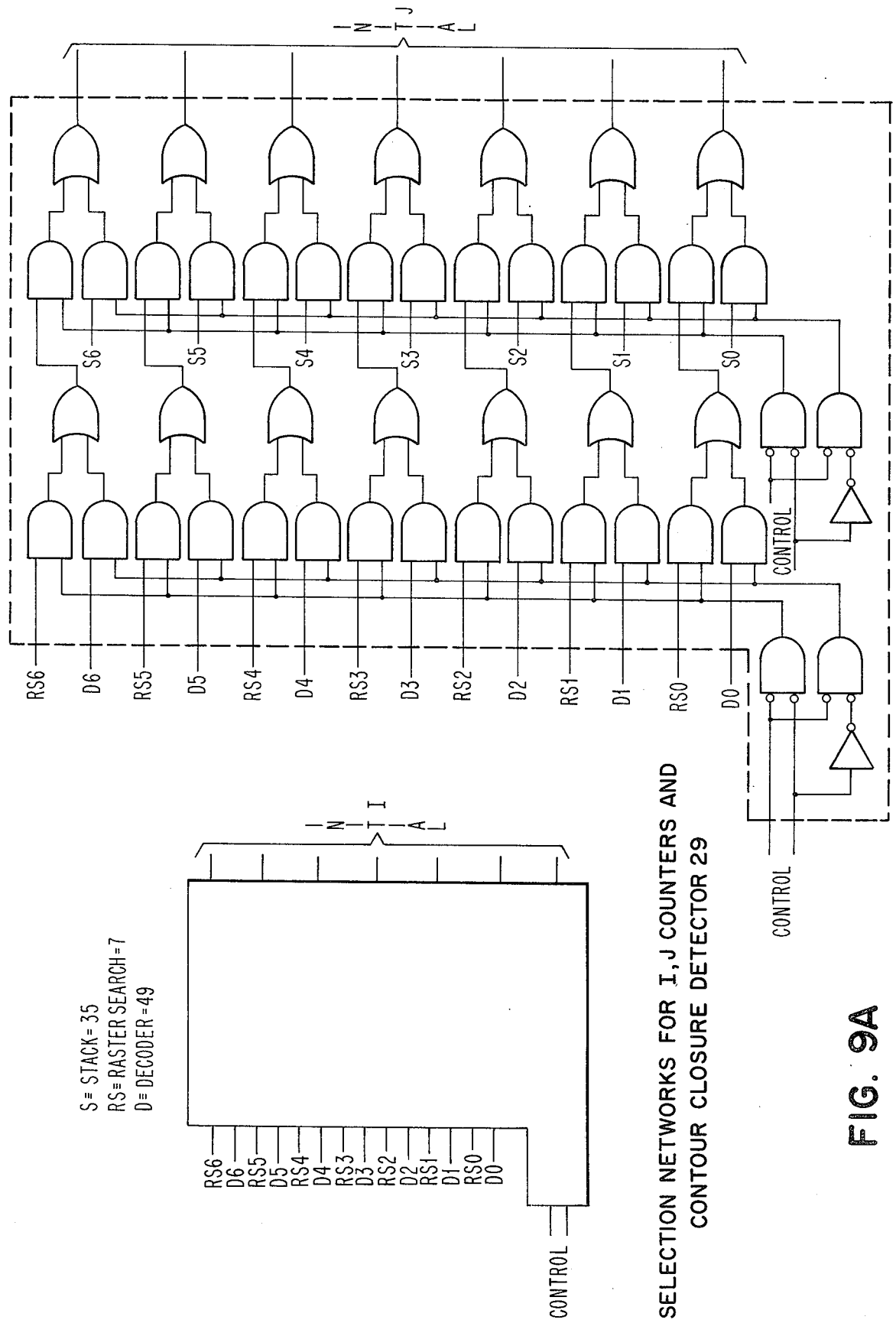
FIGS. 9A, 9B, 9B' and 9B'' show the selection networks and counters for storing the initial coordinates for the subsequent border following of an inner or outer contour.
Figure 9B:
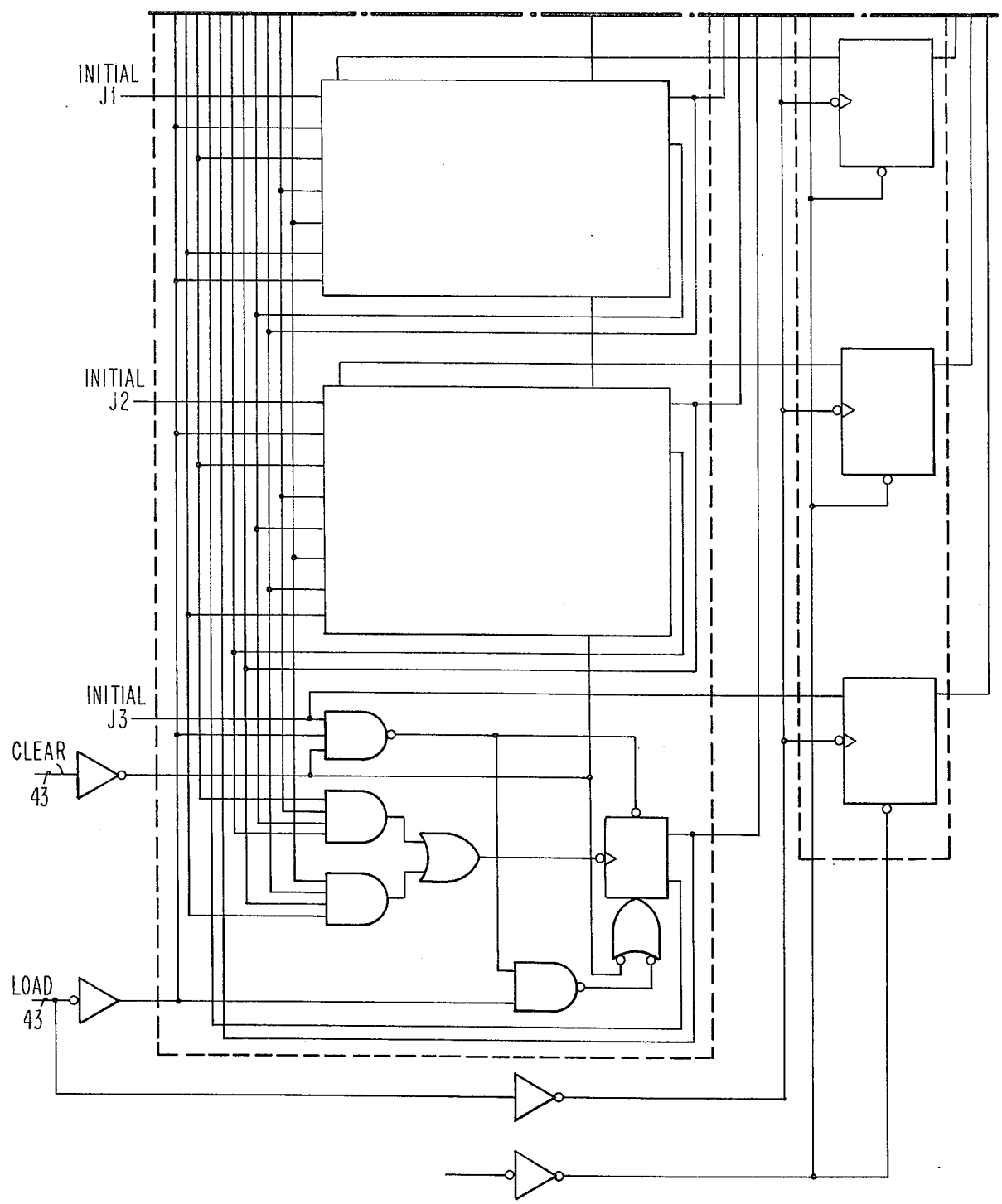

Contour move generator 15 is also known by the synonym in the specification as border follower. It is responsive to image array data from memory 11 and is interactive with the other principal system elements such as encoder/decoder 21, process control generator 45, and I,J location counters 29. The logical details of the contour generator are set forth in FIGS. 2–7C. Parenthetically, the encoder/decoder 21 is displayed in FIGS. 8A–C while the I,J counters and the contour closure detector are indicated in FIGS. 9A–C.

Figure 14:
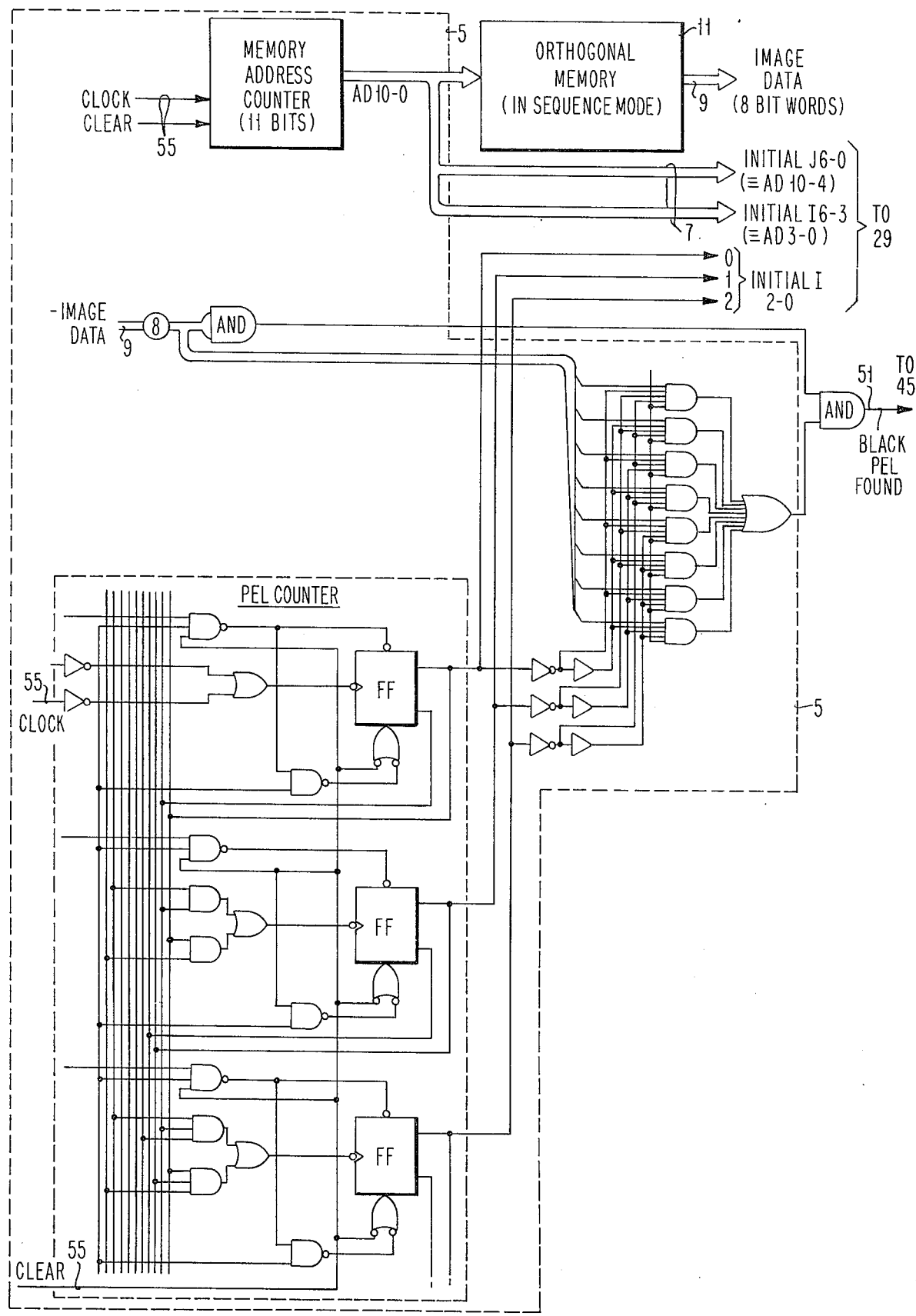
FIG. 14 shows the logic for the raster search mechanism. More particularly, in the drawings.

When, for example, it is desired to compress objects within an array field, the method of the invention requires that a raster line by line search be made until a black pel is found. Now, orthogonal random access memory 11 includes a memory address counter shown in FIG. 14. This counter is initially set to 0. The words of image data are sequentially fetched as the memory address counter is incremented. On each cycle the entire word is examined in parallel to determine if there are any black bits. If not, the next word is fetched from the memory. If so, he eight bits of the extracted memory word are individually examined from left to right via the three bit pel counter also shown in FIG. 14. A combination of the memory address counter and the raster search pel counter constitutes the I,J coordinate of the black pel. This is delivered to the up/down counters of the I,J location counter 29 and also to the initial I and J inputs via the RS inputs shown in FIG. 9A.

It should be appreciated, that the I,J location of the cursor for all boundary following activities is maintained in the I,J location counters. These counters are initialized in one of three ways. First, from the raster search when a black pel is initially found, second from the decoder 21 when an image is being decompressed, and thirdly from the stack 37 when the stack is decremented. Parenthetically, the I, J coordinates of each boundary are part of the compressed data for coding/decoding purposes. The initial I, J values are simultaneously loaded into latches which allow the border follower to detect a return to the initial point. This is detected when the comparators in FIGS. 9B, 9C show I, J and the initial I,J to be equal. During a border following operation, the cursor sequentially steps from its current I, J location to a neighboring location. This is done by causing the I and/or J counters to count up/down. This is shown in FIGS. 9B and 9C and is controlled by FIG. 4 lines 27. The contour move generator 15 shown in FIG. 2 causes the cursor to move sequentially from point to neighboring point in a clockwise direction around the border of an object or hole. The basic thought is to turn as sharply left as possible with the restriction that the next pel position must be of the same brightness, that is, black or white as the pel of the prior cursor position. The contour move generator takes the previous move direction as stored in latches 409 in FIG. 4 and presents values of the eight neighbors in the correct order to the priority encoder 359 shown in next move generator 329 of FIG. 3. This determines which of the like brightness pels has the highest priority.

Figure 12E:
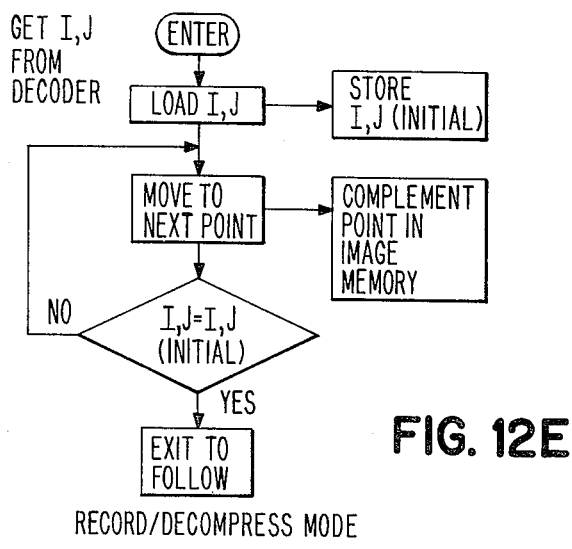

The previous move direction latches 409 in addition to being used by the contour move generator may be loaded from any one of four sources. For example, they are loaded by decoder 21 and the record/decompressed mode, FIG. 12E, the stack for re-initialization, or the possible hole detector 303 shown as part of contour move generator in FIG. 2 and FIG. 7A/7C.

Figure 4:
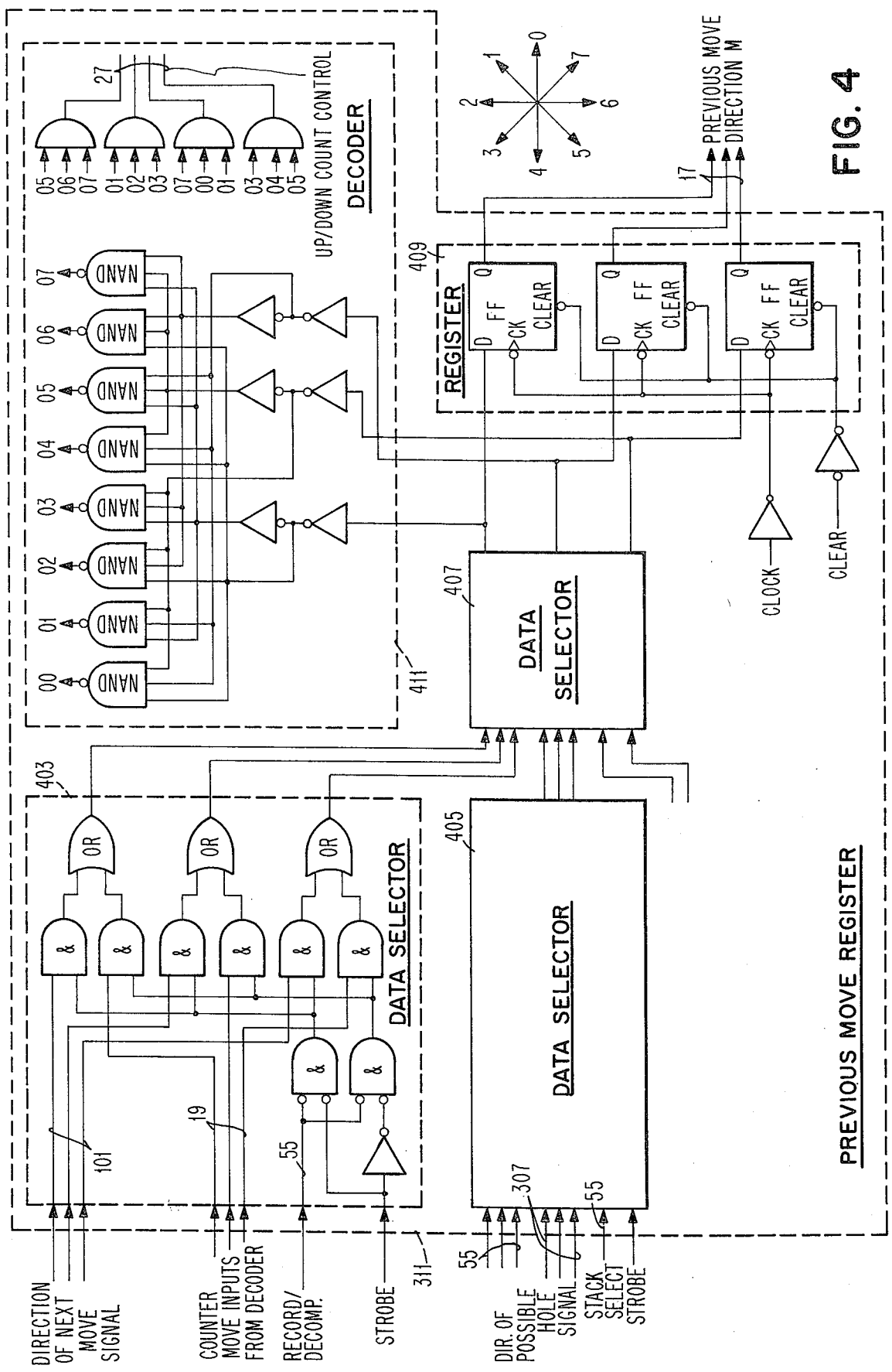
FIG. 4 is the logical embodiment of the "previous move" register of FIG. 2. It provides the signal representative of the direction of the previous move.
Figure 6:
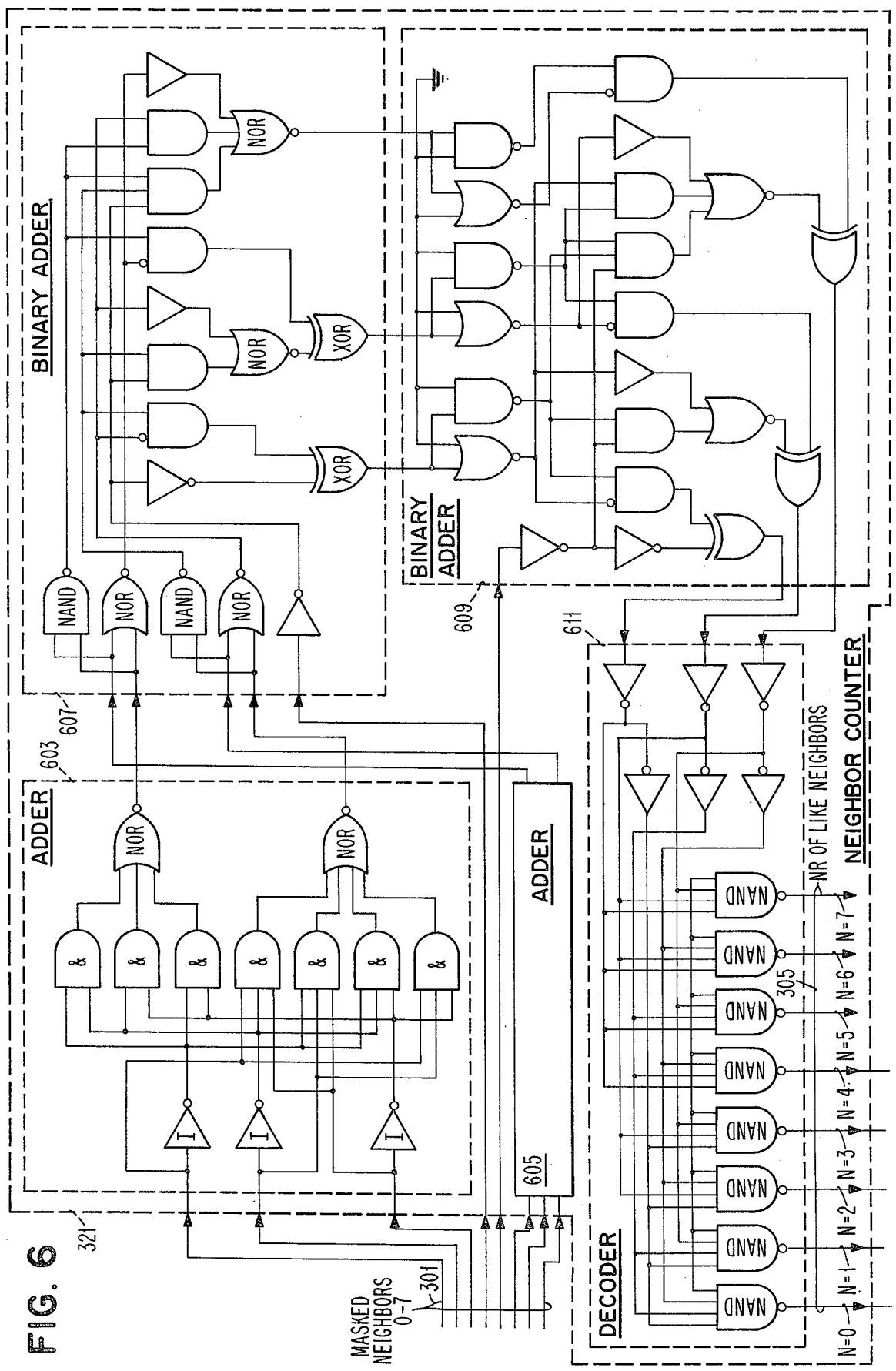
FIG. 6 sets forth a logic necessary for generating the number of neighboring pel values of the same brightness at the point along the contour at which the cursor is resting responsive to the designation of masked neighbors from the "cursor neighbor selection" element of FIG. 5.
Figure 7A:
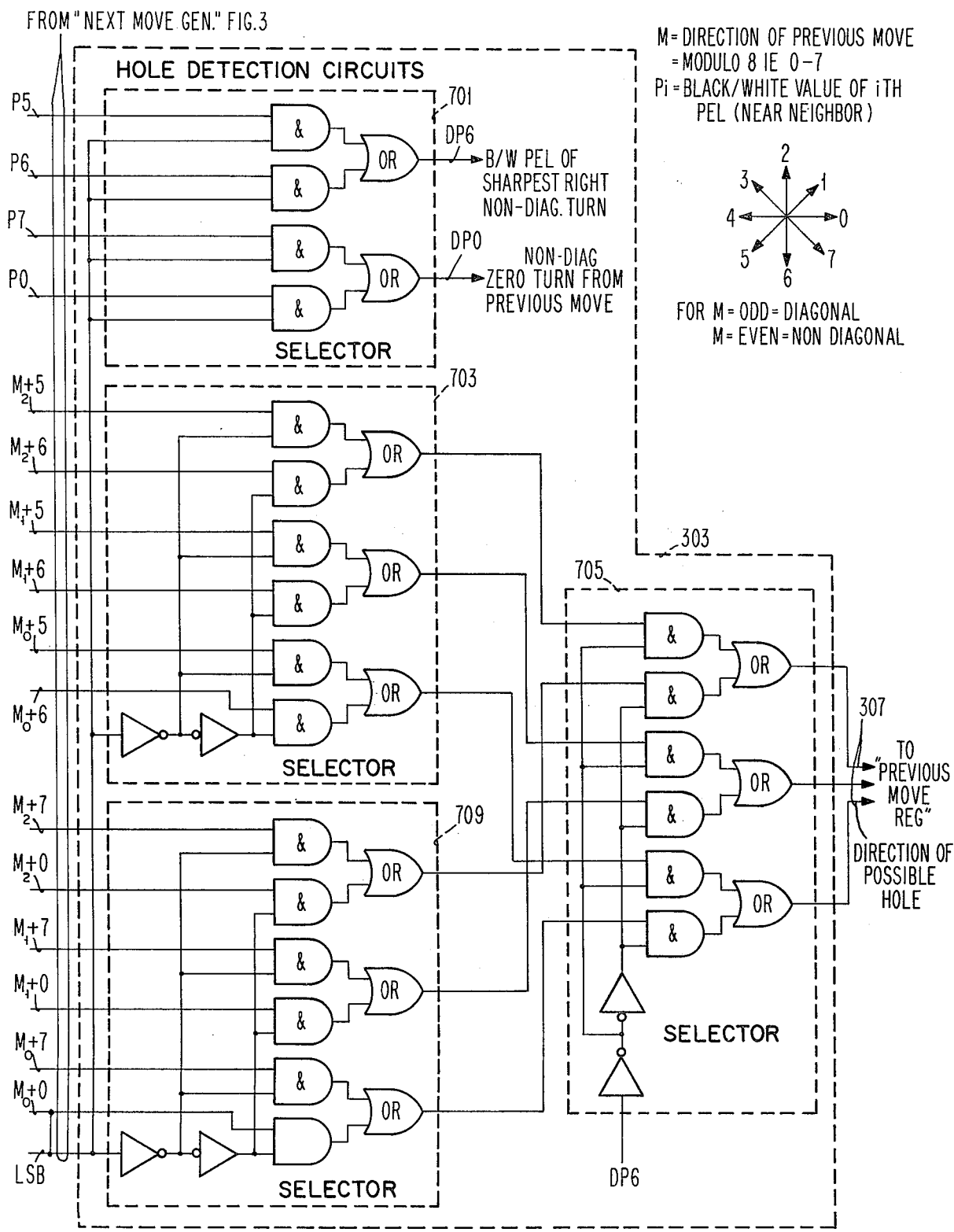
FIGS. 7A, B, and C constitute the hole detection circuit, that is, elements which evaluate the neighboring pels along a boundary in order to determine whether a white pel exists which may belong to a hole within a larger cluster of black pels termed an object or vice versa.

Referring now to FIG. 7A, there is shown how the "possible hole" pel is identified in terms of direction and brightness. The pel in question resides to the right of the direction of motion of the cursor. Specifically, these directions are M+5, M+6, M+7, or occasionally M modulo 8. M is the previous move direction 17 (FIG. 4). For example, if M is 0 then the last move was in the direction horizontally to the right. It follows that M+5, M+6, M+7 are, respectively, 5, 6, and 7 which are downward to the left, downward, and downward to the right, respectively. This can readily be seen since if the cursor is moving horizontally to the right (M=0), then "to the right of the direction of motion" is downward. The selection circuitry 709, 703 and 705 is used to select the direction which is a) nondiagonal and b) the rightmost turn on a priority bases. Selection circuitry 701 is used to select the corresponding white neighbor values which are generated by next move generator 329 in FIG. 3.

Figure 7B:
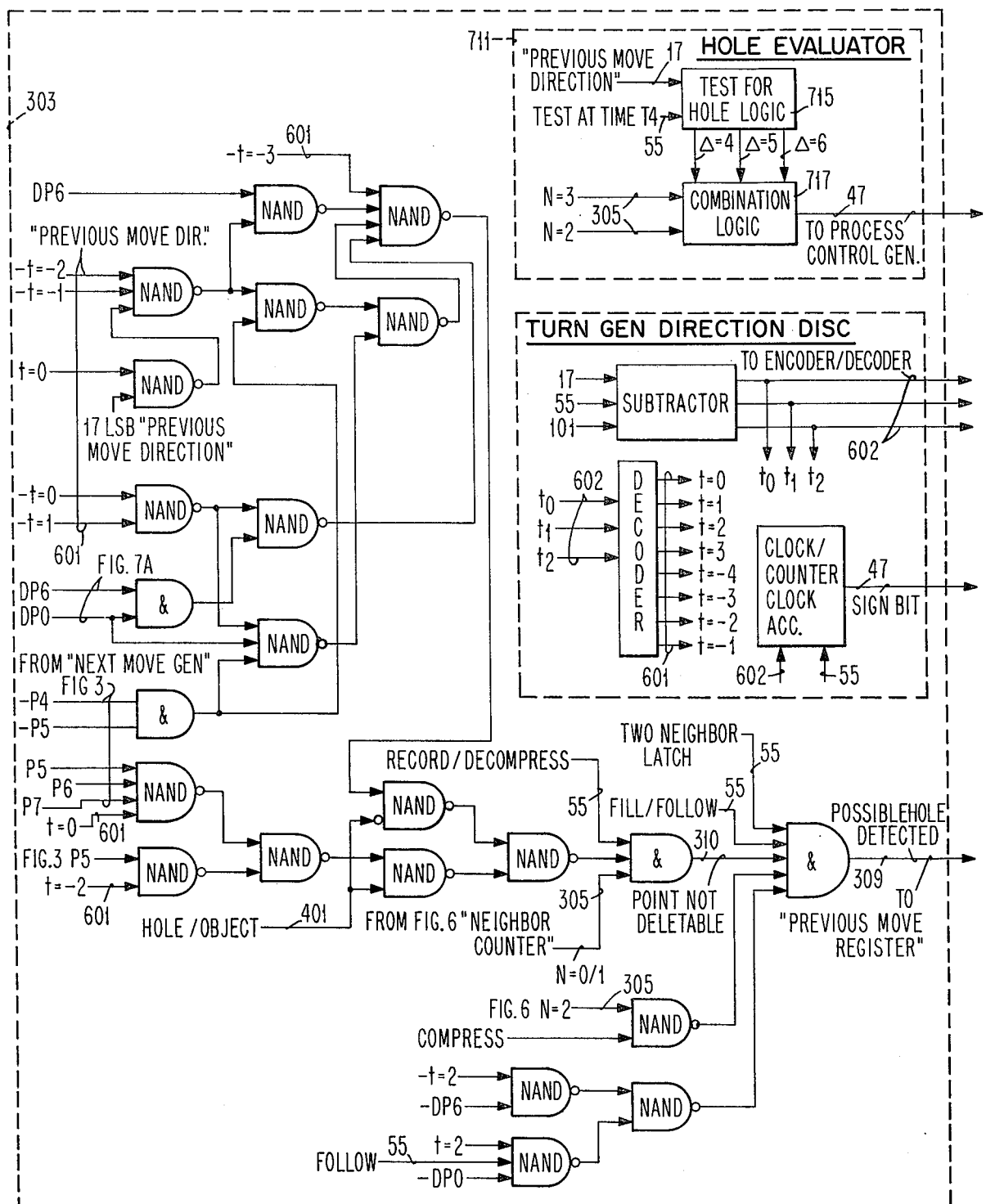

Referring now to FIG. 7B, there is disclosed primarily the combinatorial logic required to detect the presence of a possible hole pel. It also contains the turn generator and the direction discriminator 713 as well as the hole evaluator 711 described in detail in FIG. 7C.

The turn generator of FIG. 7B substracts the previous move 17 from the next move 101. This indicates a "turn" $t(602)$ from $t=+2(90°$ left) through $t=0$(straight ahead), $t=-3(135°$ right) to $t=-4(180°$ about-face). The turn 602 is used by the clockwise/counterclockwise accumulator to generate signal 47. Signal 47 indicates whether a boundary was traversed in a clockwise or counterclockwise direction during a test for hole. This is accomplished by summing the turns together and looking at the sign bit of the result.

The turn 602 is also decoded in order to obtain signals 601. Signals 601 are used by encoder 21 and the combinatorial logic comprising the balance of FIG. 7B. This logic indicates the presence of a possible hole point via line 309 by combining the actual brightness values of the neighboring pels to the right of the direction of cursor motion to the decoded turns 601. Signal 310 shows whether or not the point at which the cursor is resting is deletable in the shrink mode. This function is depicted in Tables 1 and 2 directed to "Deletability Criteria." In the tables the relative turn direction T is indicated by a real integer lying in the range $-4 \leq t \leq +3$ where $-t$ and $+t$ respectively represent a right turn and a left turn. This is set forth in the following table along with the codes used by encoder/decoder 21 (FIG. 8) for contour move generation.

TABLE 1

| t | Hole Code | Object Code | Relative Change in Azimuth |
|---|---|---|---|
| −4 | 110 | 11110 | −180° |
| −3 | — | 11101 | −135 |
| −2 | 101 | 101 | −90 |
| −1 | — | 100 | −45 |
| 0 | 0 | 0 | 0 |
| 1 | — | 110 | +45 |
| +2 | 100 | 11100 | 90 |
| +3 | — | 111110 | +135 |
| End | 111 | 111111 | |

It should be appreciated that the least significant bit LSB as used in the to be subsequently stated deletability criteria tables denotes whether the cursor move from a pel position designated as "4" in a 3 × 3 pel array was in a diagonal or non-diagonal direction.

Table 2 sets forth deletable criteria for objects in which the test for hole is initiated if the pel in pel position "6" is white.

TABLE 2

| Pel Pattern No. | t; LSB | 3×3 pel pattern | Delete if any one of the following |
|---|---|---|---|
| 1 | 0;0 | www 4bb 567 | if the numeral 6 is black or if numeral 4 or 5 are white |
| 2 | 0;1 | wwb wb0 467 | if either 6 and 0 are black; 4 is white and 0 is black; or 4, 6, and 7 are white |
| 3 | 1;0 | wwb 4b0 567 | if 6 and 0 are black; 4 and 5 are white and 0 is black; or 4, 5, 6, and 7 are white |
| 4 | 1;1 | wb wb0 467 | if 6 and 0 are black; 4 is white and 0 is black; or 4, 6, and 7 are white |
| 5 | 2;0 | | impossible |
| 6 | 2;1 | b wb 046 | none |
| 7 | −1;0 | www 4bw 56b | if 6 is black or 4 and 5 are white for pel |
| 8 | −1;1 | www wbb 46 | if 6 is black or 4 is white |
| 9 | −2;0 | www 4bw 5bw | delete always |
| 10 | −2;1 | www wbw 46b | if 6 is black or 4 is white |
| 11 | −3, | | delete always |
| 12 | −4; | | delete always |

Table 3 sets forth deletable criteria for holes wherein the test for object is initiated if 6 is black.

TABLE 3

| Pel Pattern No. | t; LSB | 3×3 pel pattern | Delete if any one of the following |
|---|---|---|---|
| 1 | 0; | bb 4ww 567 | if 5, 6 and 7 are white; 4 is black and 6 and 7 are white; or 4, 5 and 6 are black |
| 2 | −2; | bb 4ww b5w | if 5 is white or 4 is black |
| 3 | 2; | 4w 056 | none |
| 4 | −4; | | delete always |

In the above examples, point "4" is always taken to be the point from which the cursor came. It is in this regard that LSB can be said to denote whether the move from point 4 was in a diagonal or non-diagonal direction.

Figure 7C:
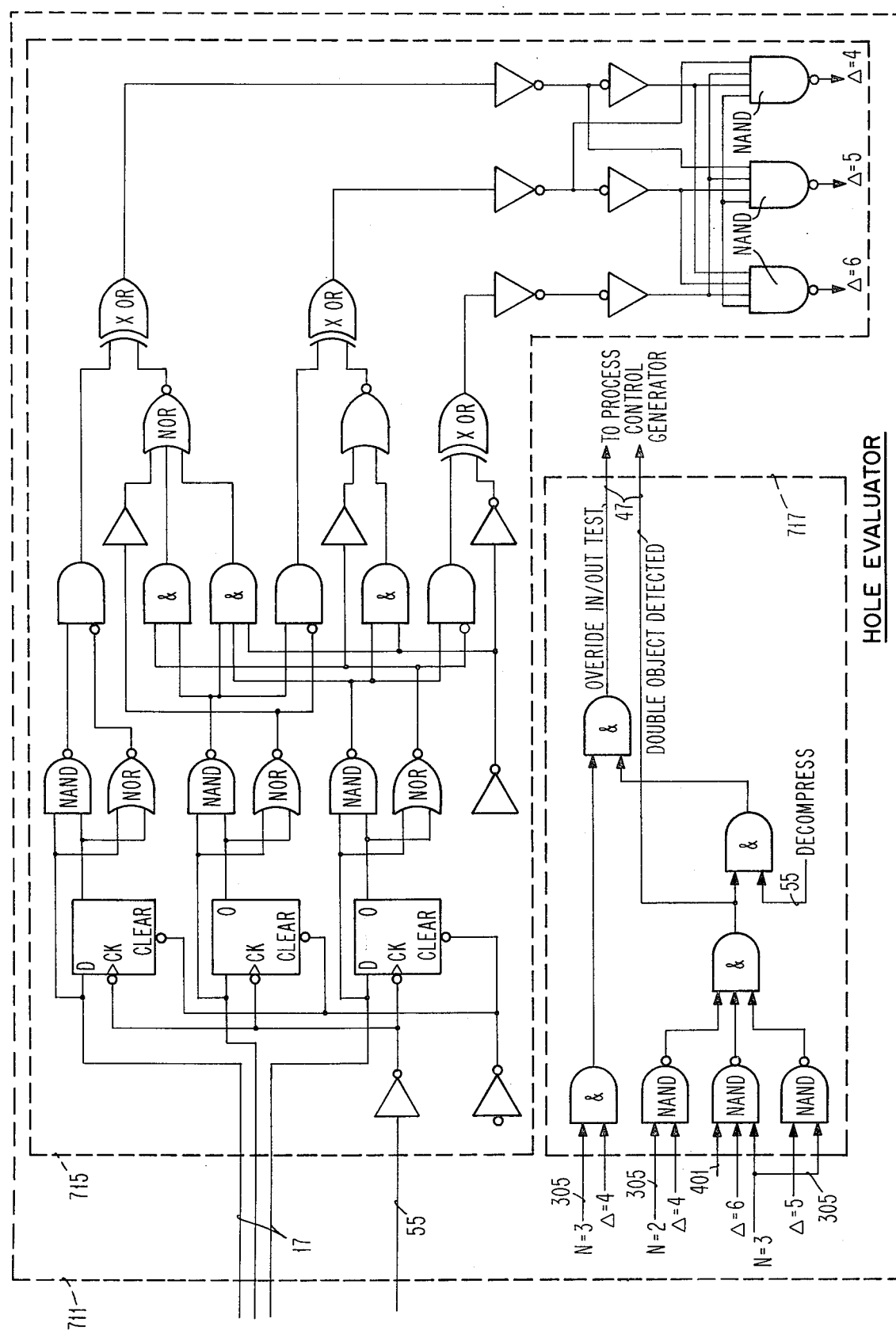

Referring now to FIG. 7C, there is shown the logic for the "hole evaluator" 711. The evaluator includes circuitry 715 for generating the signal Δ. Δ represents the relative azimuth difference between the exit and return by the cursor from and to the original point. For example, if Δ = 4, then the cursor exits from and returns to the original point via the same neighboring pel. This information, combined with neighbor count 305 at the original pel allows a detection of a double object indicated by the signals on line 47.

Completion of the test-for-hole step results in a decision based on the sign of the accumulation of turns. There are some important exceptions when this decision is either over-ridden or deferred. The first case occurs when the border of the image is encountered during the test. If it is convenient to detect this, the test may be aborted, since a hole or an object in a hole cannot contain a point on the image border. The other option is to give the image an artificial white border and rely on the outcome of the test (the follower will move on this white border, but not beyond).

The second case is caused by the fact that the border follower may return to its starting point without having traversed the entire boundary of the hole (e.g., the starting point may be in a region of the hole that is only one pel wide). Again, there are two options: the test may be aborted, since another test-for-hole must eventually be done starting at a "deletable" point; or the test may be continued until the start point is re-encountered for a second (or third) time. The current implementation is a compromise: if the test can be completed in two start point encounters, the test is continued; if not, the test is aborted. This choice is based on requirements of the record boundary step. In order to detect this case, it is necessary to do a test-for-object step each time the search-for-object step finds a black picture element, even though the outcome is predetermined. (This was not mentioned earlier to avoid confusion.) The initial move is temporarily stored, and subtracted mod 8 from the final move of the test. The result would, for example, be four if the cursor exited from and returned to the start point via the same neighbor. The presence or absence of a "double object" is determined by Δ and the like neighbor count N at the start point. Only two possibilities exist at a point found by the search-for-object step; Δ = 4, N = 2 and Δ = 5, N = 3. When one of these cases occurs, a special double object bit in the coded chain header is turned on. It is possible to eliminate the possibility of double objects (holes), but it would then be impossible to make all chain start points "upper left" adjusted.

A check is made for possible double objects (holes) on every test-for-object (hole). This requires that two additional tests be made: Δ = 5, N = 4 (test-for-object only) and Δ = 6, N = 3 (test-for-hole only). It is noted that a continuation of the test-for-hole (object) is required after a double hole (object) is detected, since the final result after two start point encounters may indicate that the set being tested was not a hole (object) after all. (This is also done on objects discovered by the search-for-object step to allow the record boundary step to get started in the usual direction.)

The only time a test-for-hole is absorbed because of a "multiple object" is when a start point has three neighbors of like brightness, none of which are neighbors of each other, and Δ is four. In the decode process, a test-for-hole (object) is aborted when a double hole (object) is encountered as a matter of convenience. It is possible in this case to have two levels of double object conditions, one associated with the hole (object) being tested, and the other with the original encoded object (hole), which causes two start point encounters in the follow step.

In addition, it will be understood by those skilled in the art that the foregoing and other changes in form and details may be made therein without departing from the spirit and scope of the invention.

What is claimed is:

1. A machine implementable method for compressing and encoding objects and hole boundaries in chain link coded form of an arbitrary black/white image composed of black and white picture elements (pels) comprising the steps of:

storing the image in a multi-dimensional writable memory;

searching said memory for black objects an object being identified when the first black pel of a plurality of black pels comprising said object is encountered;

border following said object to thereby encounter successive black pels comprising the outer boundary of said object;

activating an encoder in order to encode the X–Y coordinates or said encountered pels as the border of the object is followed until said first black pel is re-encountered;

deactivating said encoder;

changing from black to white in said multi-dimensional memory, pels corresponding to said encountered pels thereby reducing the object in order to locate inner boundaries and for eliminating the object from further consideration by reducing it to either a single point or until a white border pel adjacent to an encountered black pel indicative of a hole within the object is encountered;

reactivating said encoder in order to encode the X–Y coordinates of said encountered white pels of said hole as the border of said hole is followed until the coordinates of the initially encountered white border pel are re-encountered;

deactivating said encoder; and reducing the white pel values within the inner boundary as if the hole were a black object, the processing being recursive until the original object is in turn reduced to a single pel.

2. A machine implementable method for compressing and encoding objects and hole boundaries in chain link coded form of an arbitrary black/white image composed of black and white picture elements (pels) comprising the steps of:

storing the image in a multi-dimensional writable memory;

searching said memory in row major order for black objects, an object being identified when the first black pel of a plurality of black pels comprising said object is encountered;

border following said object to thereby encounter successive black pels comprising the outer boundary of said object;

activating an encoder in order to encode the X–Y coordinates of said encountered pels as the border of the object is followed until said first black pel is re-encountered;

the encoded data consisting of the X-Y coordinates of said first black pel and a sequence of discrete moves from boundary point to neighboring boundary point;

deactivating said encoder;

deleting from said multi-dimensional memory, pels corresponding to said recorded pels thereby reducing the object in order to locate the inner boundaries and for eliminating the object from further consideration by complementing individual pels of the object in outer contour layers of one pel thickness, the object being encircled as many times as necessary to either reduce it to a single pel or until a white border pel adjacent an encountered black bel is encountered;

reactivating said encoder in order to encode the X-Y coordinates of said encountered white pels of said hole as the border of said hole is followed by moving from one white border pel to the next until the coordinates of the initial white border pel are re-encountered;

deactivating said encoder; and complementing the pel values within the inner boundary one contour layer at a time and processing it in the same manner as if it were a black object, the process being recursive until the original object is in turn reduced to a single pel.

3. A machine implementable method for boundary encoding of a two-dimensional array of picture elements, each pel of which exhibits a Boolean value representative of black or white such that clusters of black pels are perceived as a connected object, and, further, such that each connected object possesses a single outer contour closing upon itself, and, lastly, such that each connected object selectively contains inner contours circumscribing clusters of white pels perceived as holes, the method comprising the steps of:

storing the array in a multi-dimensional writable memory;

raster scanning the array until the first black pel of a plurality of pels comprising an object is encountered;

border following said object to thereby encounter successive black pels comprising the outer boundary of said object;

activating an encoder in order to encode array coordinates of said encountered pels;

said encoded data comprising an initial array coordinate of said first black pel and a series of differential azimuths defining the coordinates of the object boundary in chain link coded form, the encoding continuing until said first black pel is re-encountered;

deactivating said encoder upon re-encountering said first black pel; and eliminating encountered pels from further consideration by processing the object in outer contour layers of one pel thickness, the processing of the outer contour layers including the steps of:
complementing the binary value of each border black pel as it is encountered such that the object is reduced, the object being encircled as many times as necessary in order to reduce it to a single pel, whereby as each pel is encountered along any contour layer said pel value is complemented if such would not fracture the object.

4. Apparatus for encoding borders of objects in a black and white image, the objects comprised of black picture elements stored in a bit-addressable random access memory comprising:

means for accessing the image in the memory in a predetermined sequential order, including means for indicating that an initial black pel of an object has been encountered, and means for indicating the memory coordinates of said initial black pel;

means responsive to said accessing means including means for following the outer border of said object to encounter successive neighboring black pels, including means for indicating the relative position of each successive black pel encountered;

means responsive to said following means for encoding the relative position of each pel in a machine usable coded format; and control means connected to said memory, responsive to said following means for changing each encountered black pel to white to thereby shrink and delete said object from said memory;

said control means including means connected to said encoding means, responsive to said following means for deactivating said encoding means upon said follower re-encountering said initial black pel to thereby de-limit the outer boundary of the object.

5. The combination according to claim 4 wherein said border following means further includes:

means for detecting an initial white pel of a hole boundary nested in said object, and for reactivating said encoding means upon such detection; and means for causing said following means to follow the outer border of said hole to encounter successive neighboring white pels, whereby, in said accessing means, said means for indicating the memory coordinates indicates the memory coordinates of said initial white pel and said means for indicating the relative position of each successive pel indicates the relative position of each successive white pel encountered;

said deactivating means further including means responsive to said border following means for deactivating said encoding means upon said border follower re-encountering said initial white pel to thereby de-limit the boundary of the hole.

6. The combination according to claim 4 wherein said apparatus further comprises:

means for storing a return address, said return address identifying the memory location of the last black pel of said object encountered prior to said detecting means having detected an initial white pel of a hole; and wherein said control means includes means for changing each encountered white pel of said hole to black to thereby effectively fill said hole with black pels;

whereby said following means is enabled to resume shrinking said object and said filled hole by following the outer black border of said object and said filled hole to thereby encounter successive neighboring black pels beginning at the black pel identified by said return address.

* * * * *

UNITED STATES PATENT OFFICE
CERTIFICATE OF CORRECTION

Patent No. 3,987,412      Dated October 19, 1976

Inventor(s) THOMAS HARVEY MORRIN II      Page 1 of 2

It is certified that error appears in the above-identified patent and that said Letters Patent are hereby corrected as shown below:

Col. 1, line 21, "0' or 1'" should read --0's or 1's--;

Col. 1, line 28, "My" should read --May--;

Col. 1, line 58, "Rosenfield," should read --Rosenfeld,--;

Col. 1, line 62, "objects" should read --object--;

Col. 2, line 22, "objects" should read --object--;

Col. 4, line 55, "I-units" should read --"I"-units--;

Col. 4, line 56, "J-units" should read --"J"-units--;

Col. 4, line 63, "This" should read --The--;

Col. 5, line 60, ""four-connecte"" should read --"four-connected"--;

Col. 7, line 19, "test for hole" should read --"test for hole"--;

Col. 7, line 21, "shrink hole" should read --"shrink hole"--;

Col. 7, line 68, "counter part" should read --counterpart--;

Col. 8, line 17, "border follower." should read --"border follower."--;

Col. 8, line 36, "he" should read --the--;

Col. 8, line 54, the sentence beginning with "The initial" should start a new paragraph;

Col. 9, line 33, "bases" should read --basis--;

UNITED STATES PATENT OFFICE
CERTIFICATE OF CORRECTION

Patent No. 3,987,412          Dated  October 19, 1976

Inventor(s)  THOMAS HARVEY MORRIN II          Page 2 of 2

It is certified that error appears in the above-identified patent and that said Letters Patent are hereby corrected as shown below:

continued -

Col 11, lines 49, 50 "double object" should read --"double object"--;

Col. 13, line 15, "bel" should read --pel--;

Col. 13, line 31, after "ments," and before "each" please insert the word --(pels)--.

Signed and Sealed this

Twenty-second Day of March 1977

[SEAL]

Attest:

RUTH C. MASON
Attesting Officer

C. MARSHALL DANN
Commissioner of Patents and Trademarks